United States Patent
Garrett et al.

(10) Patent No.: US 9,985,671 B2
(45) Date of Patent: May 29, 2018

(54) SYSTEM, DEVICE, AND METHOD FOR IMPROVING RADIO PERFORMANCE

(71) Applicant: AVAGO TECHNOLOGIES GENERAL IP (SINGAPORE) PTE. LTD., Singapore (SG)

(72) Inventors: David C. Garrett, Tustin, CA (US); Franciscus Van Der Goes, Zeist (NL); Hooman Darabi, Laguna Niguel, CA (US); Ramon A. Gomez, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 15/043,056

(22) Filed: Feb. 12, 2016

(65) Prior Publication Data
US 2017/0207803 A1    Jul. 20, 2017

Related U.S. Application Data

(60) Provisional application No. 62/279,429, filed on Jan. 15, 2016.

(51) Int. Cl.
*H04B 1/10*    (2006.01)
*H04B 1/00*    (2006.01)

(52) U.S. Cl.
CPC ......... *H04B 1/1027* (2013.01); *H04B 1/0007* (2013.01); *H04B 1/109* (2013.01)

(58) Field of Classification Search
CPC .... H04B 1/1027; H04B 1/0007; H04B 1/109; H04B 1/7085; H04B 1/709; H04B 1/7183; H04B 17/21; H04B 1/408; H04B 1/7093; H04L 27/2657; H04L 27/2662; H04L 2027/0053; H04L 2027/0022; H04L 2027/0069
USPC ................. 375/326, 343–345, 354–356, 359
See application file for complete search history.

(56) References Cited

U.S. PATENT DOCUMENTS

| | | | | |
|---|---|---|---|---|
| 4,974,679 A * | 12/1990 | Reuter | .................... | G01D 3/022 177/185 |
| 5,281,931 A * | 1/1994 | Bailey | .................... | H03H 11/04 327/553 |
| 5,451,954 A * | 9/1995 | Davis | .................... | H04B 1/665 341/200 |
| 5,602,835 A * | 2/1997 | Seki | .................... | H04L 27/2657 370/206 |
| 5,995,552 A * | 11/1999 | Moriyama | ............. | H04B 15/04 375/271 |
| 6,021,110 A * | 2/2000 | McGibney | .......... | H04L 27/2657 370/203 |
| 6,034,988 A * | 3/2000 | VanderMey | ........... | H04B 1/713 375/134 |
| 6,233,460 B1 * | 5/2001 | Nojima | ................ | H04M 1/2745 455/462 |

(Continued)

*Primary Examiner* — Emmanuel Bayard
(74) *Attorney, Agent, or Firm* — Oblon, McClelland, Maier & Neustadt, L.L.P.

(57) ABSTRACT

A device includes circuitry configured to detect one or more properties of an image signal based on outputs from one or more (analog-to-digital converter) ADC configurations of a transceiver, determine a VCO frequency corresponding to an ADC sampling frequency independently from a carrier frequency, and control the VCO frequency of at least one of a transmitter or receiver based on the one or more properties of the image signal.

18 Claims, 20 Drawing Sheets

(56) References Cited

U.S. PATENT DOCUMENTS

| | | | | |
|---|---|---|---|---|
| 6,301,545 B1* | 10/2001 | Brodie | G01C 21/005 | 342/352 |
| 6,421,077 B1* | 7/2002 | Reed, Jr. | H04L 27/066 | 348/21 |
| 6,483,867 B1* | 11/2002 | Mannermaa | G01S 19/29 | 370/335 |
| 6,693,953 B2* | 2/2004 | Cox | H04B 1/707 | 370/332 |
| 6,807,405 B1* | 10/2004 | Jagger | H04B 1/1036 | 370/318 |
| 7,295,623 B2* | 11/2007 | Raghavan | H04L 27/2601 | 375/261 |
| 7,398,074 B2* | 7/2008 | Pfann | H04B 1/30 | 455/118 |
| 7,660,372 B2* | 2/2010 | Lee | H04L 7/042 | 375/240.21 |
| 7,772,997 B2* | 8/2010 | Frederick | G06K 7/0008 | 235/375 |
| 7,830,953 B2* | 11/2010 | Fujiwara | H04B 1/7183 | 375/149 |
| 8,054,918 B2* | 11/2011 | Vis | H04L 27/22 | 375/152 |
| 8,107,572 B1* | 1/2012 | Furman | H04B 1/10 | 327/551 |
| 8,175,137 B2* | 5/2012 | Ammann | G01S 19/30 | 375/150 |
| 8,324,580 B1* | 12/2012 | Gagnon | G01T 1/1647 | 250/363.09 |
| 8,326,251 B2* | 12/2012 | Swarts | H04W 56/0035 | 455/226.1 |
| 8,346,180 B2* | 1/2013 | Kamizuma | H04B 1/0082 | 455/73 |
| 8,396,096 B2* | 3/2013 | Noel | H04B 7/0842 | 375/130 |
| 8,401,123 B2* | 3/2013 | Swarts | H04L 27/2657 | 370/336 |
| 8,442,425 B2* | 5/2013 | Walker | H04L 1/201 | 455/222 |
| 8,571,149 B2* | 10/2013 | Shi | H03G 3/3042 | 375/326 |
| 8,625,218 B1* | 1/2014 | Song | G11B 20/10203 | 360/39 |
| 8,787,433 B2* | 7/2014 | Chaudhuri | H04B 1/406 | 370/395.5 |
| 8,855,580 B2* | 10/2014 | Dent | H04B 1/525 | 455/114.2 |
| 8,958,504 B2* | 2/2015 | Warke | H04L 27/0014 | 375/235 |
| 9,160,356 B1* | 10/2015 | Kearney | H03M 3/386 | |
| 2003/0052698 A1* | 3/2003 | Fujiyama | G11B 20/10009 | 324/613 |
| 2003/0053562 A1* | 3/2003 | Busson | H04L 27/06 | 375/322 |
| 2003/0087617 A1* | 5/2003 | Shohara | H03J 7/04 | 455/192.2 |
| 2005/0010121 A1* | 1/2005 | Ross | A61B 5/0428 | 600/509 |
| 2005/0157819 A1* | 7/2005 | Wang | H04L 27/364 | 375/322 |
| 2005/0266808 A1* | 12/2005 | Reunamaki | H04B 1/1027 | 455/101 |
| 2005/0281318 A1* | 12/2005 | Neugebauer | H04B 1/707 | 375/134 |
| 2006/0023811 A1* | 2/2006 | Yoon | H04L 27/2273 | 375/326 |
| 2006/0273965 A1* | 12/2006 | Gat | H01Q 1/3233 | 343/711 |
| 2008/0051053 A1* | 2/2008 | Fedan | H04B 1/123 | 455/296 |
| 2008/0225174 A1* | 9/2008 | Greggain | H04N 5/46 | 348/572 |
| 2009/0268848 A1* | 10/2009 | Tan | G01R 31/31932 | 375/316 |
| 2009/0290660 A1* | 11/2009 | Neugebauer | H04B 1/707 | 375/340 |
| 2010/0128824 A1* | 5/2010 | Hui | H04L 27/2657 | 375/344 |
| 2011/0206100 A1* | 8/2011 | Kapoor | H04L 27/2601 | 375/221 |
| 2011/0223901 A1* | 9/2011 | Swarts | H04L 27/2657 | 455/422.1 |
| 2011/0251826 A1* | 10/2011 | McGoogan | G01H 1/003 | 702/189 |
| 2012/0288043 A1* | 11/2012 | Chen | H04B 1/109 | 375/345 |
| 2013/0028360 A1* | 1/2013 | Rofougaran | H04B 1/001 | 375/350 |
| 2013/0044842 A1* | 2/2013 | Wang | H04L 27/08 | 375/345 |
| 2013/0083876 A1* | 4/2013 | Suzuki | H04B 1/1036 | 375/350 |
| 2014/0014839 A1* | 1/2014 | Chang | G06F 3/017 | 250/338.4 |
| 2015/0288555 A1* | 10/2015 | Kanno | H04L 27/2613 | 370/350 |
| 2015/0381228 A1* | 12/2015 | Milenkovic | H04B 17/12 | 375/219 |
| 2017/0148478 A1* | 5/2017 | Kadlec | G11B 7/0941 | |

\* cited by examiner

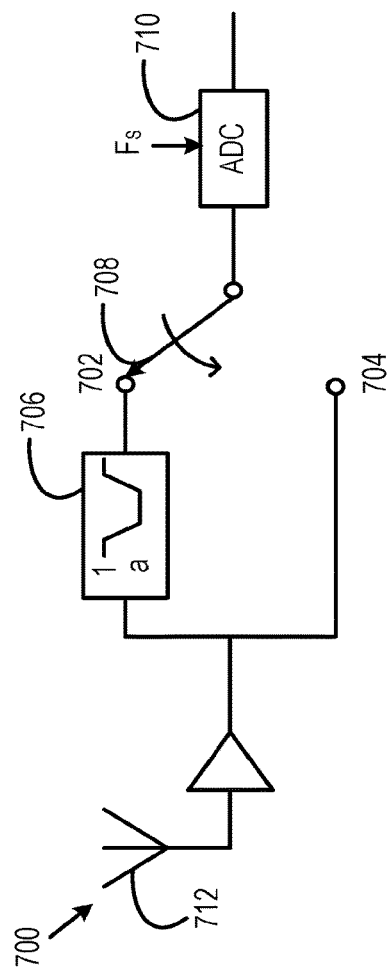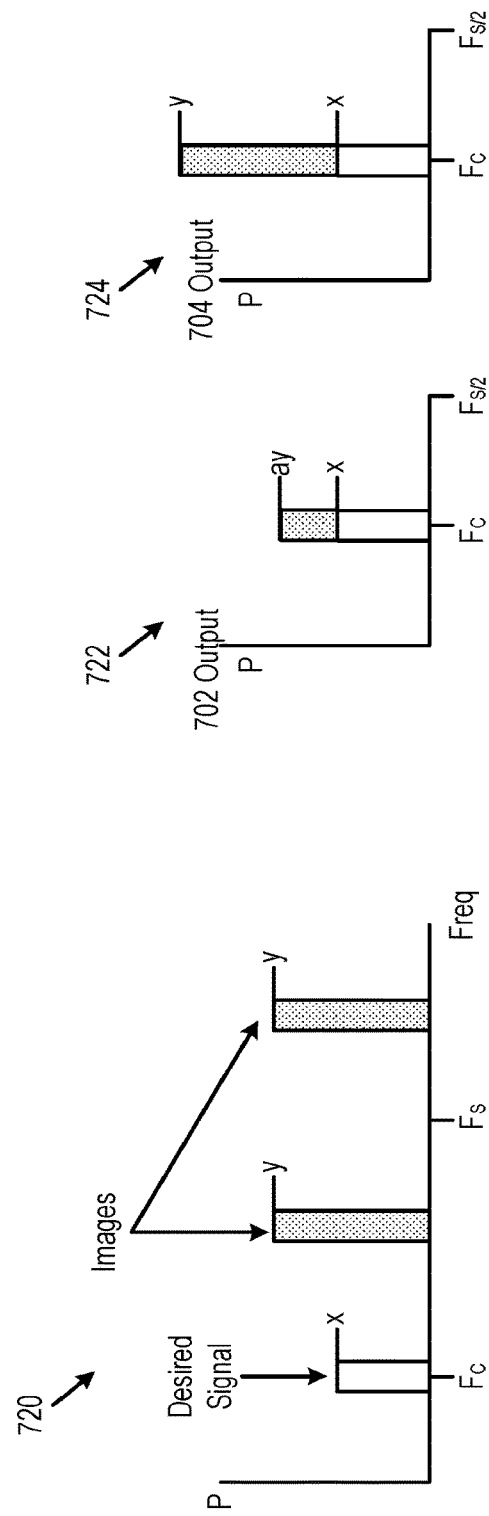

SYSTEM, DEVICE, AND METHOD FOR IMPROVING RADIO PERFORMANCE

CROSS-REFERENCE TO RELATED PATENT APPLICATIONS

The present application claims the benefit of the earlier filing date of U.S. provisional application 62/279,429 having common inventorship with the present application and filed in the U.S. Patent and Trademark Office on Jan. 15, 2016, the entire contents of which being incorporated herein by reference.

BACKGROUND

Technical Field

The present disclosure relates to software defined radio (SDR), specifically a device, system, and method for improving SDR performance.

Description of the Related Art

Software defined radio (SDR) provides the opportunity to develop fully programmable wireless communication systems, effectively supplanting conventional radio technologies, which typically have the lowest communication layers implemented in primarily in fixed, custom hardware circuits. However, SDRs are susceptible to signals generated at image frequencies, which is a problem that does not exist in classical narrowband transceivers.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A is an exemplary diagram of a receiver, according to certain embodiments;

FIG. 7B is an exemplary graph of received signals, according to certain embodiments;

FIG. 7C is an exemplary graph of received signals, according to certain embodiments;

DETAILED DESCRIPTION

Figure 1:
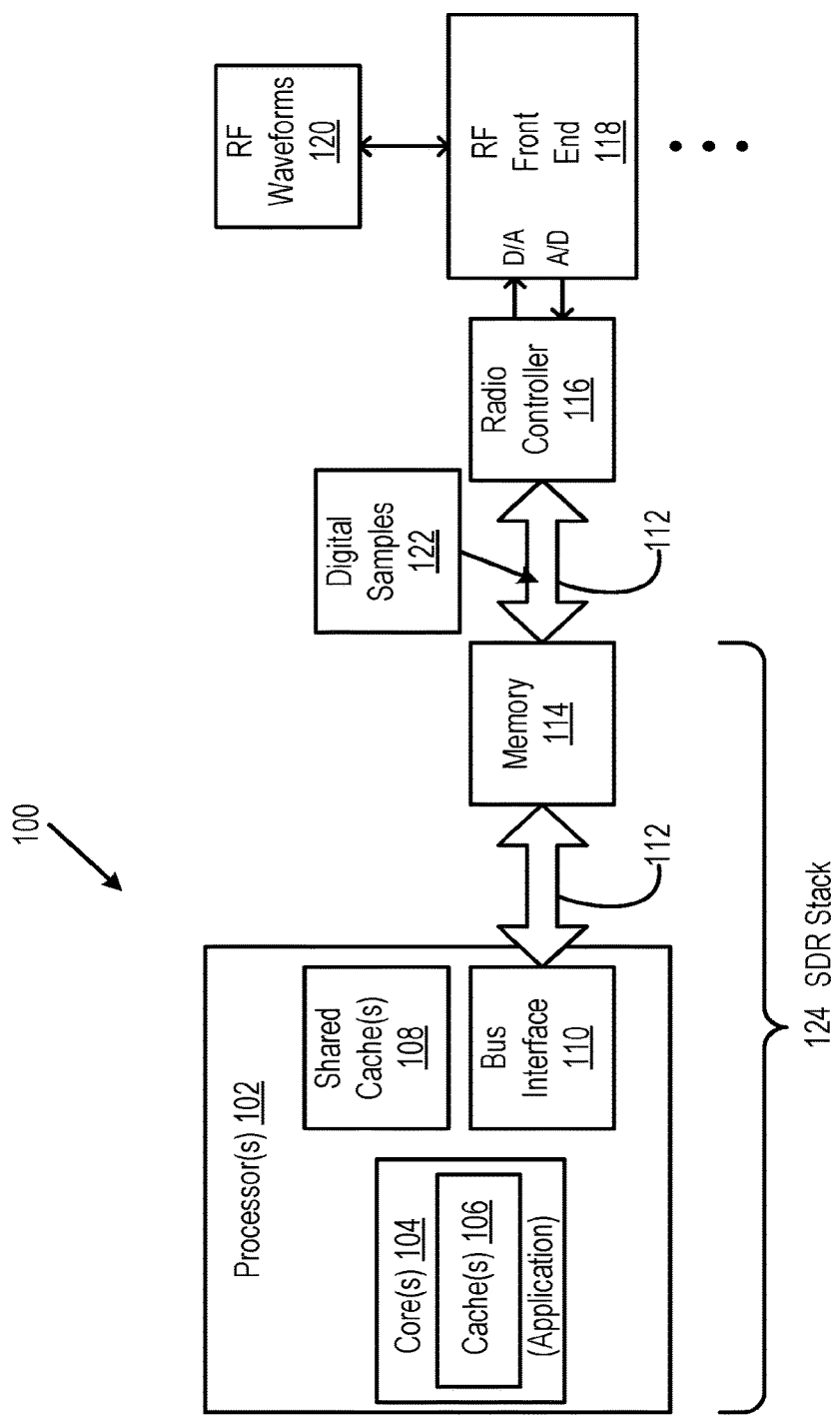
FIG. 1 is an exemplary illustration of a software defined radio (SDR) architecture, according to certain embodiments.

In the drawings, like reference numerals designate identical or corresponding parts throughout the several views. Further, as used herein, the words "a," "an" and the like generally carry a meaning of "one or more," unless stated otherwise.

In an exemplary implementation, a device includes circuitry configured to detect one or more properties of an image signal based on outputs from one or more (analog-to-digital converter) ADC configurations of a transceiver, determine a VCO frequency corresponding to an ADC sampling frequency independently from a carrier frequency, and control the VCO frequency of at least one of a transmitter or receiver based on the one or more properties of the image signal.

In another exemplary implementation, a method includes detecting one or more properties of an image signal based on one or more ADC configurations of a transceiver; determining a VCO frequency corresponding to an ADC sampling frequency independently from a carrier frequency; and controlling the VCO frequency of at least one of a transmitter or receiver based on the one or more properties of the image signal.

In another exemplary implementation, a device includes circuitry configured to detect a received signal at a predetermined carrier frequency, isolate the received signal from an image signal produced at one or more image frequencies, and modify one or more operating parameters of a transceiver front end based on a characteristic of the image signal.

Aspects of the present disclosure are directed to systems, devices, and methods for detecting image signals in received signals. The image signals are signals that are produced at a transmitter or aliased to the received signals at a receiver causing interference with the received signals. The frequency of the image signals can be determined based on the sampling frequency of the transmitter or receiver. The implementations of the present disclosure address the issue of detecting and removing image signals from received signals in a fundamentally different way than conventional techniques and are based on the fact that a voltage controlled oscillator (VCO) frequency in software defined radio (SDR) can be set independently from a signal carrier frequency. In certain embodiments, the SDR detects signal content at the image frequencies, determines an optimal VCO frequency to reduce the effects of the image signals by moving the image signal to an alternate frequency that does not disrupt a desired signal, and issues a control signal to modify the VCO/PLL frequency to the determined optimal frequency. In addition, applying the implementations of the present disclosure with SDR allows image signals to be detected over a wideband frequency spectrum.

Implementations disclosed herein present a fully programmable software defined radio (SDR) platform and system able to be implemented on general-purpose computing devices, including personal computer (PC) architectures. Implementations of the SDR herein combine the performance and fidelity of general-purpose processor (GPP) SDR platforms. In addition, implementations of the SDR herein may use both hardware and software components and techniques to perform the processes described herein.

FIG. 1 illustrates an exemplary architecture of an SDR platform and system 100 according to some implementations herein. The SDR platform and system 100 includes one or more processors 102 that may be multi-core processors according to some implementations. Each core 104 includes one or more corresponding onboard local caches 106 that are used by the corresponding 104 during processing. Additionally, the processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In addition, the processor 102 may be reprogrammable hardware such as Field Programmable Gate Arrays (FPGA), or even dedicated hardware engines. In one example illustrated, one or more cores can be allocated for performing processing for the SDR, while other remaining cores can perform processing for other applications, the operating system, or the like. Further, in some implementations, two or more processors 102 can be provided, and cores 104 across the two or more processors 102 can be used for SDR processing.

The processor 102 is in communication via bus interface 110 with a high-throughput, low-latency bus 112, and thereby to a system memory 114. The bus 112 may be a PCIe bus or other suitable bus having a high data throughput with low latency. Further, the bus 112 is also in communication with a radio controller 116. As is discussed further below, the radio controller 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, the RF front end 118 may include analog-to-digital (A/D) and digital-to-analog (D/A) converters, and necessary circuitry for radio frequency transmission, as is discussed further below.

During receiving, the RF front end 118 acquires an analog RF waveform 120 from the antenna, possibly down-converts the waveform to a lower frequency, and then digitizes the analog waveform into discrete digital samples 122 before transferring the digital samples 122 to the radio controller 116. During transmitting, the RF front end 118 accepts a stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the processor 102, the design of RF front end 118 can be rather generic. For example, the RF front end 118 can be implemented in a self-contained module with a standard interface to the radio controller 116. Multiple wireless technologies defined on the same frequency band can use the same RF front end hardware 118. Furthermore, various different RF front ends 118 designed for different frequency bands can be coupled to radio controller 116 for enabling radio communication on various different frequency bands. Therefore, implementations herein are not limited to any particular frequency or wireless technology.

According to some implementations herein, the radio controller 116 is a PC interface board optimized for establishing a high-throughput, low-latency path for transferring high-fidelity digital signals between the RF front end 118 and memory 114. The interfaces and connections between the radio front end 118 and multi-core processor 102 can enable sufficiently high throughput to transfer high-fidelity digital waveforms. Accordingly, to achieve a predetermined system throughput, some implementations of the radio controller 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices. The radio controller 116 can also be a dedicated hardware bus connection, and may even be co-located with the processor 102 and the RF front end 118.

One role of the radio controller 116 is to act as a bridge between the synchronous data transmission at the RF front end 118 and the asynchronous processing on the processor 102. The radio controller 116 implements various buffers and queues, together with a large onboard memory, to convert between synchronous and asynchronous streams and to smooth out bursty transfers between the radio controller 116 and the system memory 114. The large onboard memory further allows caching of pre-computed waveforms for quick transmission of the waveforms, such as when acknowledging reception of a transmission, thereby adding additional flexibility for software radio processing.

In addition, the radio controller 116 provides a low-latency control path for software to control the RF front end hardware 118 and to ensure that the RF front end 118 is properly synchronized with the processor 102. For example, wireless protocols have multiple real-time deadlines. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The radio controller 116 of implementations herein also provides for such low latency control.

Figure 2:
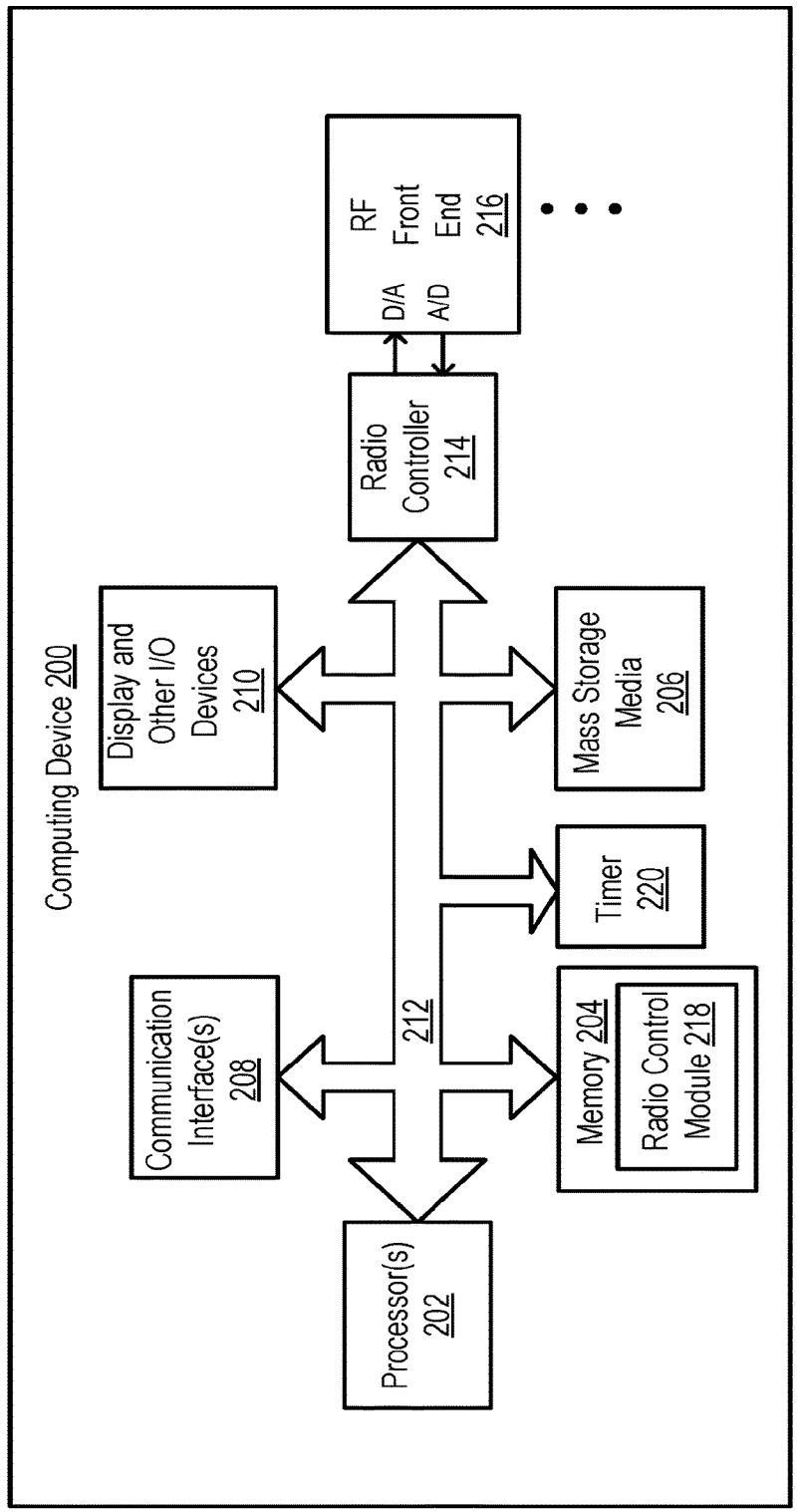
FIG. 2 is an exemplary diagram of a hardware and logic configuration of a computing device, according to certain embodiments.

FIG. 2 illustrates an exemplary depiction of a computing device 200 that can be used to implement the SDR implementations described herein, such as the SDR platform and system 100 described above with reference to FIG. 1. In the implementations described further herein, the computing device 200 may be any hardware device that can perform wireless communications, such as a wireless access point or mobile device that can implement one or more wireless communication protocols, such as a base station, switch, router, user equipment (UE), and the like. Throughout the disclosure, the terms computing device and SDR can be used interchangeably.

The computing device 200 includes one or more processors 202, a memory 204, one or more mass storage devices or media 206, communication interfaces 208, and a display and other input/output (I/O) devices 210 in communication via a system bus 212. In addition, the computing device 200 can also include one or more timer blocks 220 in order to provide a notion of time to the various components of the computing device 200. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio controller 214 and RF front end 216 for implementing the SDR herein. For example, system bus 212 may be a PCIe compatible bus, or other suitable high throughput, low latency bus. The radio controller 214 and the RF front end 216 may correspond to the radio controller 116 and the RF front end 118 described previously with reference to FIG. 2, and as also described below, such as with reference to FIG. 3. Furthermore, a radio control module 218 can include software instructions stored in memory 204 or other computer-readable storage media for controlling operations on radio controller 214, as is described additionally below. The computing device 200 described herein is only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Figure 3:
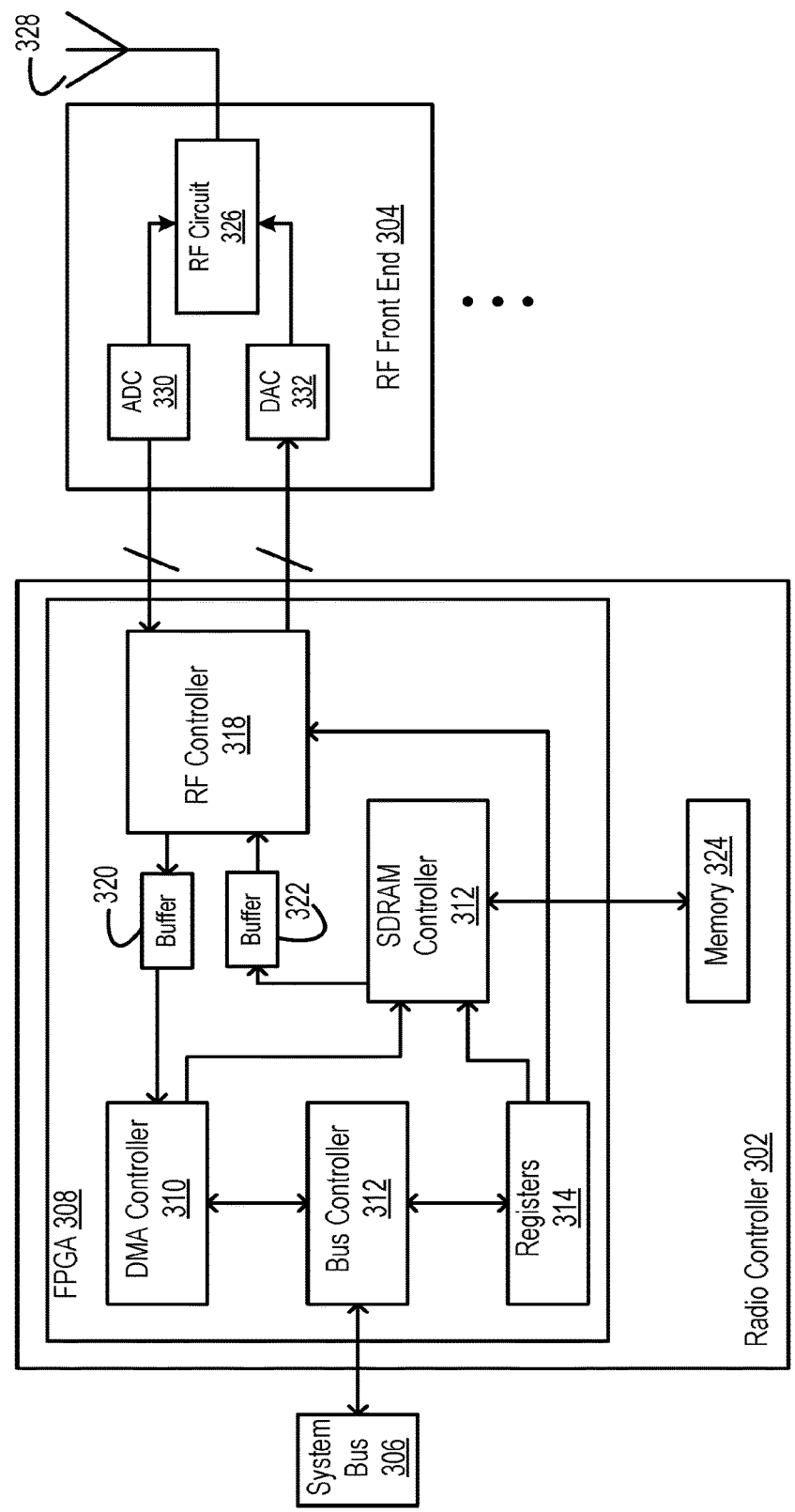
FIG. 3 is an exemplary diagram of a radio controller and a RF front end, according to certain embodiments.

FIG. 3 illustrates an exemplary implementation of a radio controller 302 and RF front end 304 that may correspond to the radio controller 116, 214 and RF front end 118, 216 described previously. In the example illustrated, the radio controller 302 includes functionality for controlling the transfer of data between the RF front end 304 and a system bus 306, such as buses 112, 212 discussed previously. In the illustrated implementation, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. The radio controller 302 includes a direct memory access (DMA) controller 310, a bus controller 312, registers 314, an SDRAM controller 316, and an RF controller 318. The radio controller 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like.

The radio controller 302 can connect to various different RF front ends 304. In some implementations, the RF front end 304 includes an RF circuit 326 configured as an RF transceiver for receiving radio waveforms from an antenna 328 and for transmitting radio waveforms via antenna 328. The RF front end 304 further may include an analog-to-digital converter (ADC) 330 and a digital-to-analog converter (DAC) 332. As discussed previously, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into the radio controller 302. Alternatively, in other implementations, analog-to-digital converter 330 and digital-to-analog converter 332 may be incorporated into the radio controller 302, and RF front end 304 may merely have an RF circuit 326 and antenna 328. Other variations may also be apparent in view of the disclosure herein.

In the implementation illustrated in FIG. 3, the DMA controller 310 and bus controller 312 interface with the memory and processor on the computing device (not shown in FIG. 3) and transfer digital samples between the radio controller 302 and the system memory on the computing device, such as memory 114, 204 discussed above. The radio controller software control module 218 discussed above with reference to FIG. 2 sends commands and reads radio controller states through radio controller registers 314. The radio controller 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large radio controller memory 324 enables implementations of the radio controller manager module 218 (e.g., FIG. 2) to first write the generated samples onto the radio controller memory 324, and then trigger transmission with another command to the radio controller 302. This functionality provides flexibility to the implementations of the SDR manager module 218 for pre-calculating and storing of digital samples corresponding to several waveforms before actually transmitting the waveforms, while allowing precise control of the timing of the waveform transmission.

In SDR implementations, functionality of some radio components is achieved through execution of one or more software processes by the processing circuitry of the processor 202 rather than through dedicated hardware components, which can be referred to as software defined components. For example, the filter components, and digital signal processor may be software defined components of the SDR. In addition, some of the components of the RF front end 216 can also be executed as software defined components and/or are configured by the software defined components. For example, the configuration of the ADCs of the receiver can be modified by control signals issued by the processing circuitry.

Figure 4A:
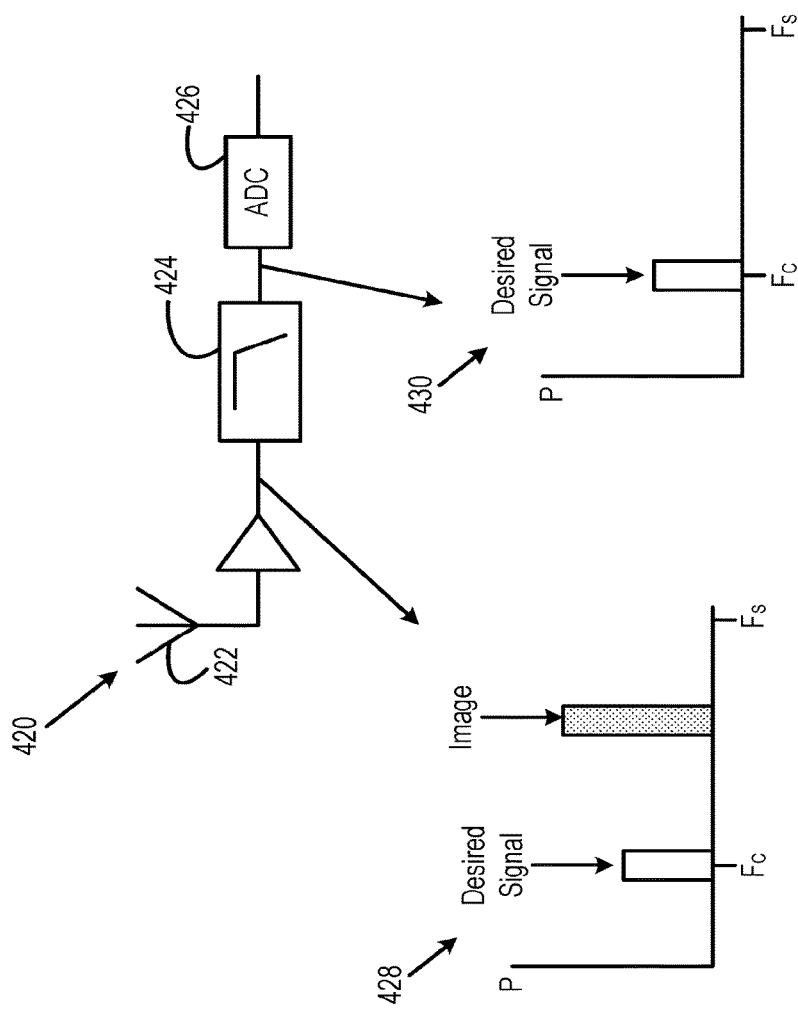
FIG. 4A is an exemplary diagram a related art receiver, according to certain embodiments.

FIG. 4A is an exemplary diagram of a related art receiver 420, according to certain embodiments. A signal received at antenna 422 is input to an anti-aliasing filter 424, which is a low-pass filter, but other filter types can also be used, according to some implementations. The filter 424 is applied at an image frequency in order to remove the image signal from the received signal. Graph 428 illustrates the received signal that is input to the filter 424, which includes a desired signal component at a carrier frequency $F_C$ and an image signal. Graph 430 shows the image signal has been removed from the received signal by the filter 424, leaving only the desired signal, which is then input to ADC 426. While the filter 424 is able to remove the image signal, the filter 424 may be very complex and is often difficult to integrate on chips.

Figure 4B:
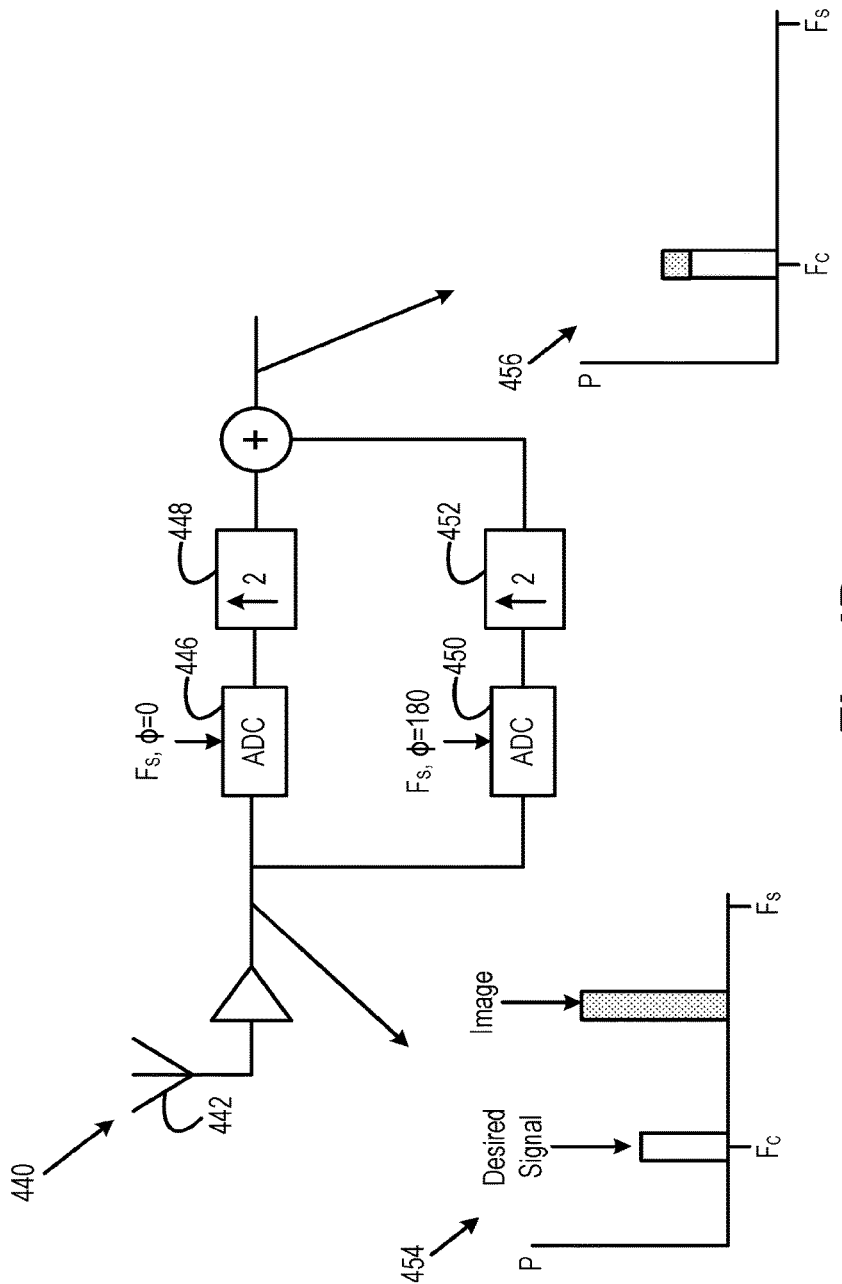
FIG. 4B is an exemplary diagram of a related art receiver, according to certain embodiments.

FIG. 4B is an exemplary diagram of a related art receiver 440 that applies interleaved ADCs to the received signal, according to certain embodiments. A signal received at antenna 442 is shown in graph 454, which illustrates the received signal that is input to interleaved ADCs 446 and 450, which includes a desired signal component at a carrier frequency $F_C$ and an image signal. The receiver 440 illustrates 2-X interleaving but can also be extended to include N-X interleaving. Interleaving the ADCs effectively increases the sampling frequency of the ADCs 446 and 450. The sampling rates $F_S$ of the ADC 446 and ADC 450 are separated by a phase angle of 180°, and the digitized samples are input to upsamplers 448 and 452, which upsample the outputs of the ADCs 446 and 450 by a factor of two. The upsampled signals are summed together, and the output is represented by graph 456, which shows the desired signal at the carrier frequency $F_C$ along with residue from the image signal, which results from imperfections in interleaving, which causes image signal leakage. In some implementations, the leakage can be approximately −40 dB. Leakage issues can be improved by calibrating the interleaved ADCs 446 and 450, but leakage may still occur, and the interleaved ADCs also do not cover a wide band of frequencies.

Figure 4C:
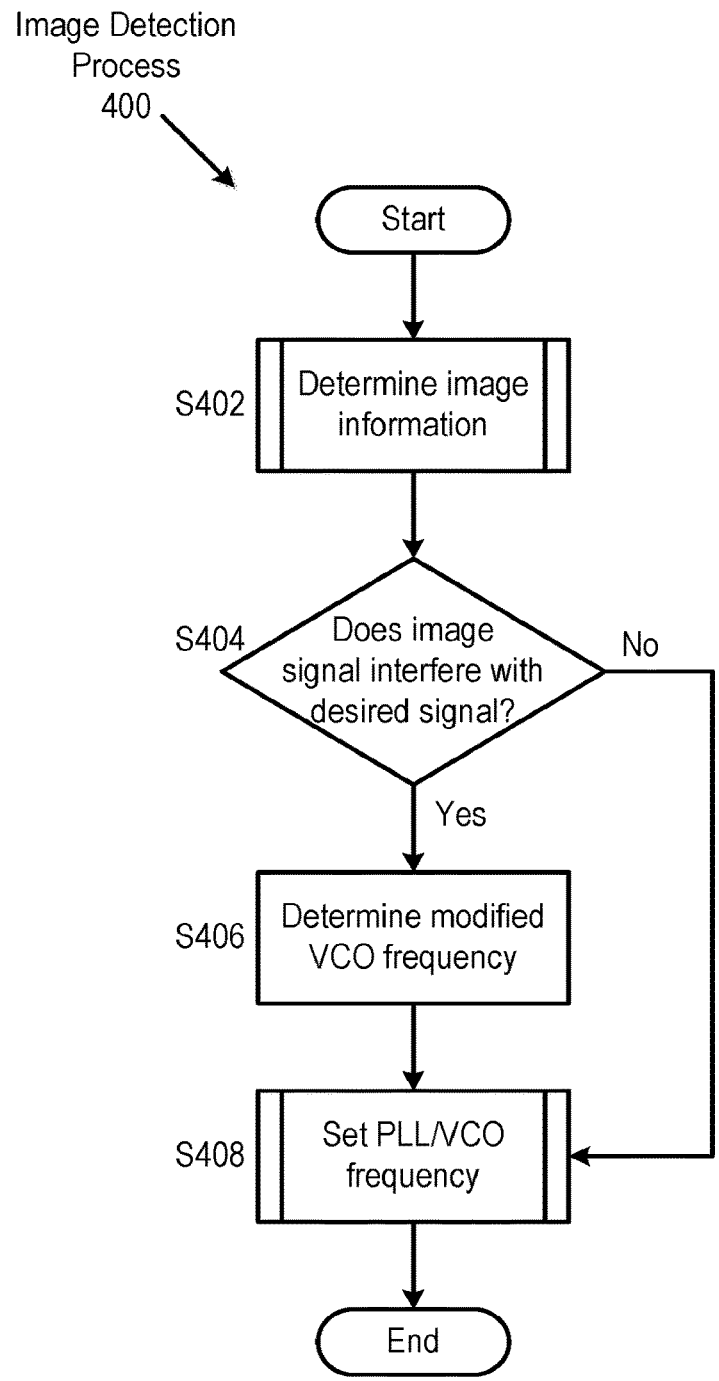
FIG. 4C is an exemplary flowchart of an image detection process, according to certain embodiments.

FIG. 4C is an exemplary flowchart of an image detection process 400, according to certain embodiments. The steps of the image detection process 400 can be performed by processing circuitry of the computing device 200 that is configured with one or more RF front ends 216. For example, the one or more RF front ends 216 can include any combination of transmitter circuits, receiver circuits, or integrated transceiver circuits. Details regarding implementations of the RF front end 216 are discussed further herein.

At step S402, the processing circuitry of the computing device 200 determines image information via one or more image detection techniques. In some implementations, the image information can be detected based on outputs from one or more receiver/ADC configurations. Details regarding image signal content detection are discussed further herein.

In addition, the image information can also be obtained based on knowledge of wireless communication applications that are implemented within a corresponding geographical region. The image information can also be obtained based on a receiving a known message from a predetermined transmitter (not shown) to which the receiver is tuned. The receiver can be synced to the predetermined transmitter via a communication channel with a carrier frequency that is not equal to a carrier frequency on which the known message is sent. The processing circuitry of the computing device 200 can determine the image information based on differences between the received signal and known properties of the known message sent from the predetermined transmitter.

At step S404, it is determined whether the image signals interfere with a desired signal. In some implementations, the determination of whether the image signal interferes with the desired signal is based on which technique is used to detect the image information. For example, signal power (also referred to as strength), image power, and comparison and/or correlation of outputs from ADCs can be used to determine whether the image signals interfere with the desired signal. Details regarding the image interference determination are discussed further herein. If it is determined that the image signal interferes with the desired signal, resulting in a "yes" at step S404, then step S406 is performed. Otherwise, if it is determined that the image signal does not interfere with the desired signal, resulting in a "no" at step S404, then the process continues to step S408.

At step S406, if the image signal interferes with the desired signal, then the processing circuitry of the computing device 200 determines a modified phase locked loop (PLL)/VCO frequency where the image signal does not interfere with the desired signal. In some implementations, the PLL includes a VCO and maintains the VCO locked on a predetermined frequency. However, in other implementations, the VCO may be free running without a PLL. Throughout the disclosure, references to the VCO frequency refer to the frequency maintained by the PLL and/or VCO. For the implementations described further herein, a VCO is associated with each of the analog-to-digital converters (ADCs). The sampling frequency of the analog-to-digital converters (ADCs) corresponds to the VCO frequency and can be determined such that the image signals are moved to frequencies that correspond to design frequencies associated with filters in the receivers so that the image signals are filtered out of the received signals.

At step S408, the VCO frequency is set at a transmitter or receiver of the computing device 200 or other device under the control of the computing device 200. For example, in some instances, the processing circuitry of the computing device 200 can issue control signals to modify the VCO frequency of a transmitter when power at the image frequencies are generated by a local transmitter of the computing device 200 or a transmitter that can be controlled by the computing device 200. In addition, the processing circuitry of the computing device 200 can issue control signals to modify the VCO frequency of a receiver when power at the image frequencies are generated by a transmitter that cannot be controlled by the computing device 200. Details regarding the setting of the VCO frequency are discussed further herein.

Figure 5A:
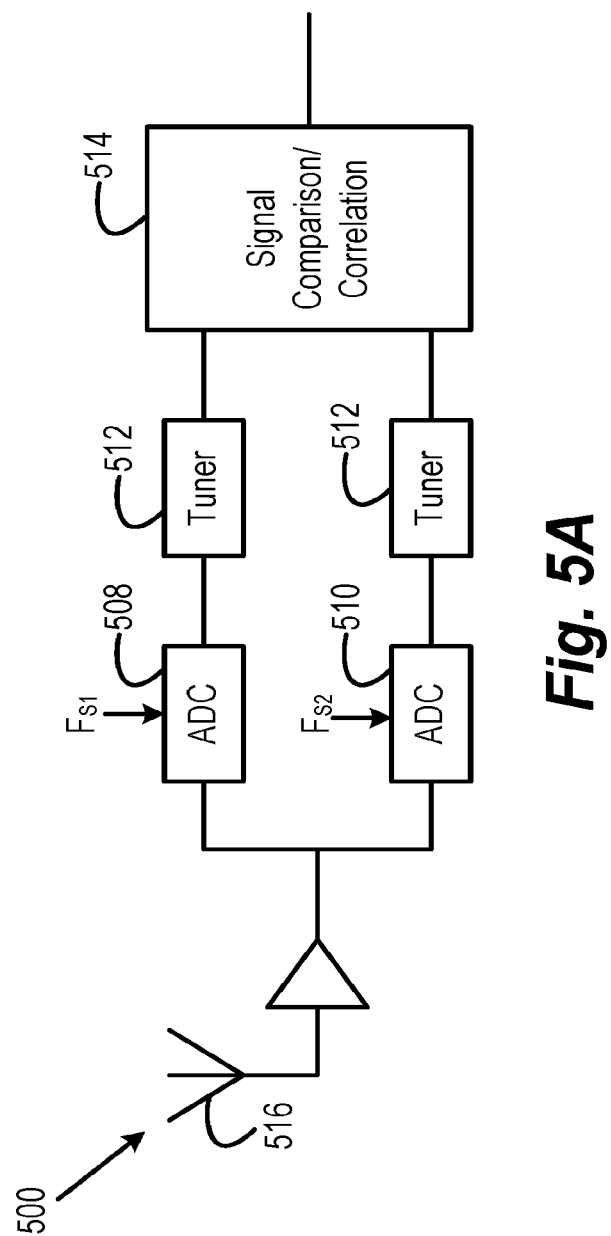
FIG. 5A is an exemplary diagram of a receiver, according to certain embodiments.

FIG. 5 is an exemplary diagram of a receiver 500, according to certain embodiments. The receiver 500 illustrates one technique for detecting image signals in received signals that includes sampling received signals with multiple ADCs at unequal sampling rates and performing a signal comparison and/or correlation to detect the image signals in the received signals. The receiver 500 includes an antenna 516 and two parallel receiver paths each having an ADC 508 and 510. In one implementation, the ADCs 508 and 510 are low-noise ADCs with a noise floor that is less than a predetermined threshold. In some aspects, the receiver 500 can also have more than two parallel receiver paths with corresponding low-noise ADCs. The ADC 508 has a first sampling frequency $F_{S1}$ and the ADC 510 has a second sampling frequency $F_{S2}$ that is not equal to the first sampling frequency $F_{S1}$. The receiver 500 also includes tuners 512 in each of the receiver paths to tune the received signals to corresponding frequency bands so that the outputs of the ADCs 508 and 510 can be compared and/or correlated at the signal comparison/correlation block 514. The tuners 512 and/or signal comparison/correlation block can be software defined radio components that are implemented by the processing circuitry of the computing device 200. In addition, to benefit from hardware and power costs of implementing low-noise ADCs 508 and 510 in the receiver 500, the processing circuitry of the computing device 200 can remove the image signals from the received signals output from the ADCs 508 and 510 and combine the desired signal components of the received signal to boost the strength of the received signal.

Figure 5C:
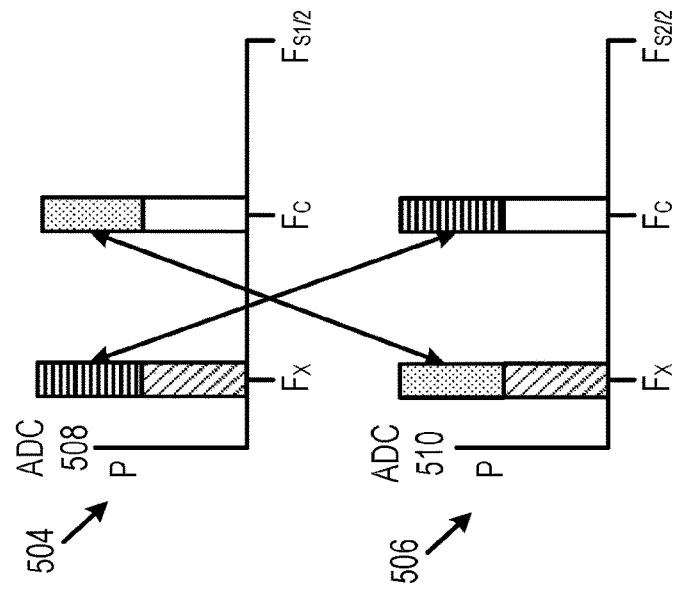
FIG. 5C is an exemplary graph of received signals, according to certain embodiments.
Figure 5B:
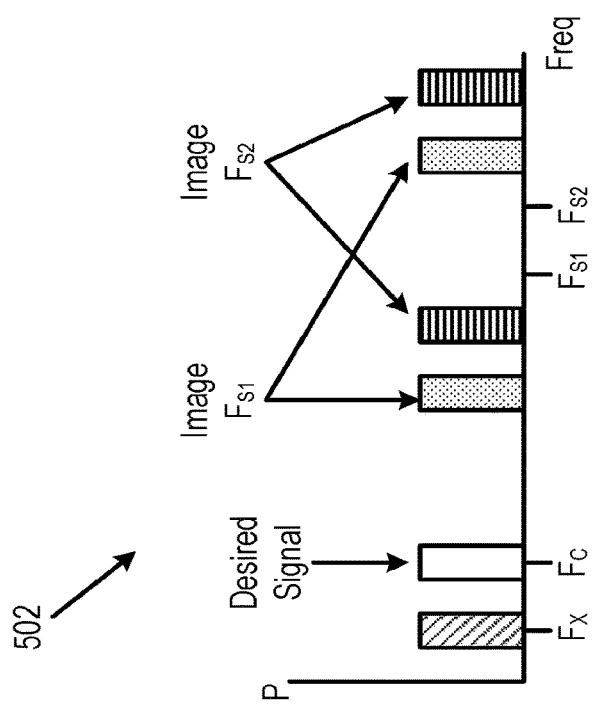
FIG. 5B is an exemplary graph of received signals, according to certain embodiments.

FIGS. 5B and 5C are exemplary graphs illustrating signals at the receiver 500, according to certain embodiments. In FIG. 5B, graph 502 illustrates the signals received by the receiver 500 that have sampled the received signal at the first and second sampling frequencies $F_{S1}$ and $F_{S2}$, respectively. For example, the desired signal is located at carrier frequency $F_C$, and an additional received signal is positioned at frequency $F_X$. One set of image signals is centered on first sampling frequency $F_{S1}$, and a second set of image signals is centered on the second sampling frequency $F_{S2}$.

In FIG. 5C, graphs 504 and 506 illustrate the received signals that have been tuned to corresponding frequency bands at the tuners 512 and how the image correlation is performed. For example, the graph 504 illustrates the tuned signal output for the ADC 508 with the image signal for $F_{S2}$ mapped to the additional signal at $F_X$ and the image signal for $F_{S1}$ mapped to the desired signal at $F_C$. The graph 506 illustrates the tuned signal output for the ADC 510 with the image signal for $F_{S1}$ mapped to the additional signal at $F_X$ and the image signal for $F_{S2}$ mapped to the desired signal at $F_C$. The processing circuitry of the computing device 200 compares the tuned signals associated with the ADCs 508 and 510 to detect differences in the received signals at the carrier frequency $F_C$. Also, as shown in the graphs 504 and 506, the processing circuitry correlates the received signals at the carrier frequency $F_C$ and the additional frequency $F_X$ to identify the image signals associated with the first sampling frequency $F_{S1}$ and the second sampling frequency $F_{S2}$. When the image signals have been correlated, the processing circuitry can determine whether to shift the VCO frequency to a frequency where the received signal is unaffected by the image signals, such as to a frequency associated with a filter that can remove the image signals from the received signal.

Figure 6:
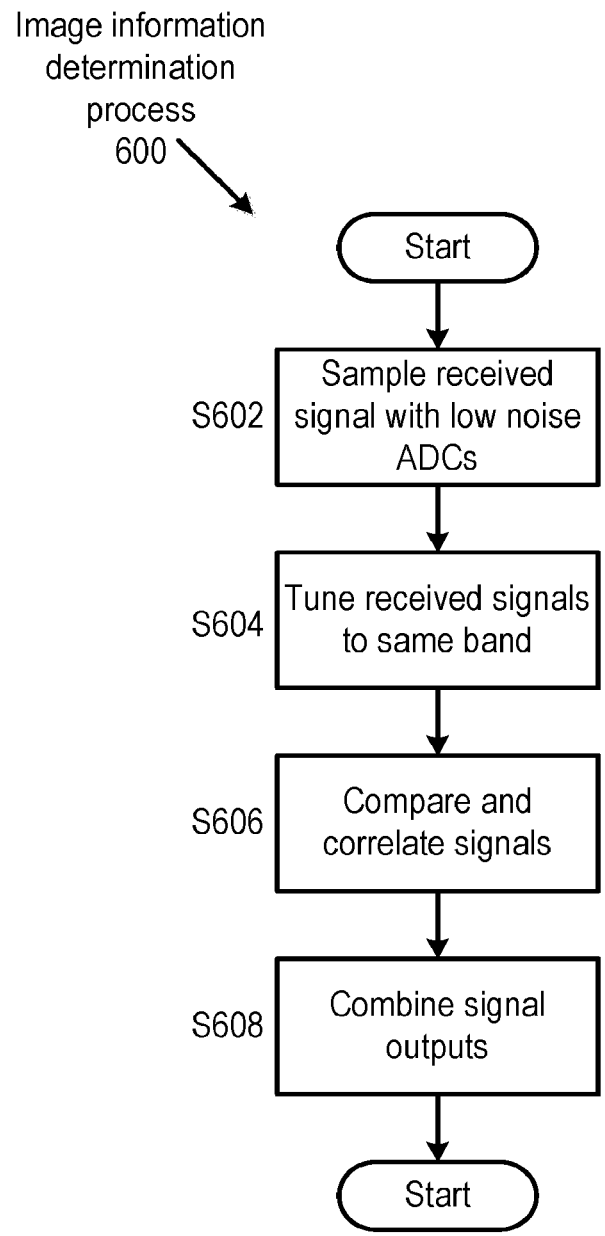
FIG. 6 is an exemplary flowchart of an image information determination process, according to certain embodiments.

FIG. 6 is an exemplary flowchart of an image information determination process 600, which is one implementation of step S402 of the image detection process 400, according to certain embodiments. The steps of the image information determination process 600 are described with respect to the receiver 500 but can also be implemented with other receiver configurations, such as receiver configurations with greater numbers of receiver paths and ADCs.

At step S602, the received signal is sampled with multiple analog-to-digital converters (ADCs) having unequal sampling rates. As shown in FIG. 5B, the graph 502 illustrates the signals received by the receiver 500 that have sampled the received signal at the first and second sampling frequencies $F_{S1}$ and $F_{S2}$, respectively. For example, the desired signal is located at carrier frequency $F_C$, and an additional received signal is positioned at frequency $F_X$. One set of image signals is centered on first sampling frequency $F_{S1}$, and a second set of image signals is centered on the second sampling frequency $F_{S2}$.

At step S604, the received signals are tuned to corresponding frequency bands at the tuners 512. For example, as shown in graph 504 of FIG. 5C, the output from the ADC 508 that includes the desired signal at the carrier frequency $F_C$, the additional signal at the frequency $F_X$, and the image signals at the first and second sampling frequencies $F_{S1}$ and $F_{S2}$ are tuned to a frequency band from zero to $F_{S1}/2$. In addition, the image signal for $F_{S2}$ mapped to the additional signal at $F_X$ and the image signal for $F_{S1}$ mapped to the desired signal at $F_C$. Likewise, as shown in graph 506 of FIG. 5C, the output from the ADC 510 that includes the desired signal at the carrier frequency $F_C$, the additional signal at the frequency $F_X$, and the image signals at the first and second sampling frequencies $F_S$, and $F_{S2}$ are tuned to a frequency band from zero to $F_{S2}/2$. The image signal for $F_{S1}$ mapped to the additional signal at $F_X$ and the image signal for $F_{S2}$ mapped to the desired signal at $F_C$.

At step S606, the processing circuitry of the computing device 200 compares and correlates the received signals to detect the image signals. The processing circuitry of the computing device 200 compares the tuned signals associated with the ADCs 508 and 510 to detect differences in the received signals at the carrier frequency $F_C$. Also, as shown in the graphs 504 and 506, the processing circuitry correlates the received signals at the carrier frequency $F_C$ and the additional frequency $F_X$ to identify the image signals associated with the first sampling frequency $F_{S1}$ and the second sampling frequency $F_{S2}$. When the image signals are correlated, the processing circuitry determines properties associated with the image signals, such as image frequency, or strength (power), or an originating source of the image signals. When the image signals have been correlated, the processing circuitry can determine whether to shift the VCO frequency to frequency where the received signal is unaffected by the image signals, such as to a frequency associated with a filter that can remove the image signals from the received signal.

At step S608, the outputs from each of the ADCs are combined to boost the signal strength of the received signal. To benefit from hardware and power costs of implementing low-noise ADCs 508 and 510 in the receiver 500, the processing circuitry of the computing device 200 can remove the image signals from the received signals output from the ADCs 508 and 510 and combine the desired signal components of the received signal to boost the strength of the received signal.

FIG. 7A is an exemplary diagram of a receiver 700, according to certain embodiments. The receiver 700 illustrates one technique for detecting image signals in received signals that includes toggling between an attenuation filter path and an unfiltered path to detect the image signals present in the received signal. The receiver 700 includes an antenna 716 and two parallel receiver paths that are connected to an ADC 710 via a switch 708 that toggles between a first toggle position 702 connecting the ADC 710 to attenuation filter path and a second toggle position 704 connecting the ADC 710 to the unfiltered path. The attenuation filter path includes a filter 706. In some implementations, the filter 706 is configured to attenuate approximately 10-20 dB at predicted image signal frequencies but can also be configured for other amounts of attenuation. In one example, the filter 706 is a bandpass filter but can also be any other type of signal filter.

The processing circuitry of the computing device 200 can issue control signals to the switch 708 to toggle between the first toggle position 702 and the second toggle position 704 at a predetermined rate, such as between each received signal packet or at a fraction of the sampling frequency, so that corresponding signals are output from the ADC 710 at the first toggle position 702 and the second toggle position 704 and differences in the outputs from each of the toggle positions 702 and 704 can be detected. If the difference between the output powers for the attenuation filter path and unfiltered path is less than a predetermined threshold, then image signals may not be present in the received signal. However, if the difference between the output powers for the attenuation filter path and unfiltered path is greater than or equal to a predetermined threshold, then image signals may be present in the received signal, and the VCO frequency may be modified to a frequency that is unaffected by the image signals. The processing circuitry can also compare other properties of the image signals for the attenuation filter path and the unfiltered path, such as a signal-to-noise ratio (SNR).

FIGS. 7B and 7C are exemplary graphs illustrating signals at the receiver 700, according to certain embodiments. In FIG. 7B, graph 720 illustrates the signals received by the receiver 700. For example, the desired signal is located at carrier frequency $F_C$, and image signals are centered on sampling frequency $F_S$. In addition, the desired signal has a signal strength of magnitude x, and the image signals have a signal strength of magnitude y.

In FIG. 7C, graph 722 illustrates the receiver output for the attenuation filter path at first toggle position 702 of the switch 708, and graph 724 illustrates the receiver output for the unfiltered path at the second toggle position 704 of the switch 708. The graph 722 shows that the for the attenuation filter path, the receiver output includes the desired signal with a signal strength of magnitude x plus an image signal with a signal strength of ay, which corresponds to the signal strength of the image y times an attenuation factor a of the filter 706. The graph 724 shows that the for the unfiltered path, the receiver output includes the desired signal with a signal strength of magnitude x plus an image signal with a signal strength of y. In some implementations, the difference between total signal strength for the output of the attenuation filter path (x+ay) and the unfiltered path (x+y) is greater than or equal to the predetermined threshold, which can indicate that image signals are present in the received signal at a frequency that corresponds to a frequency band of the filter 706.

Figure 8:
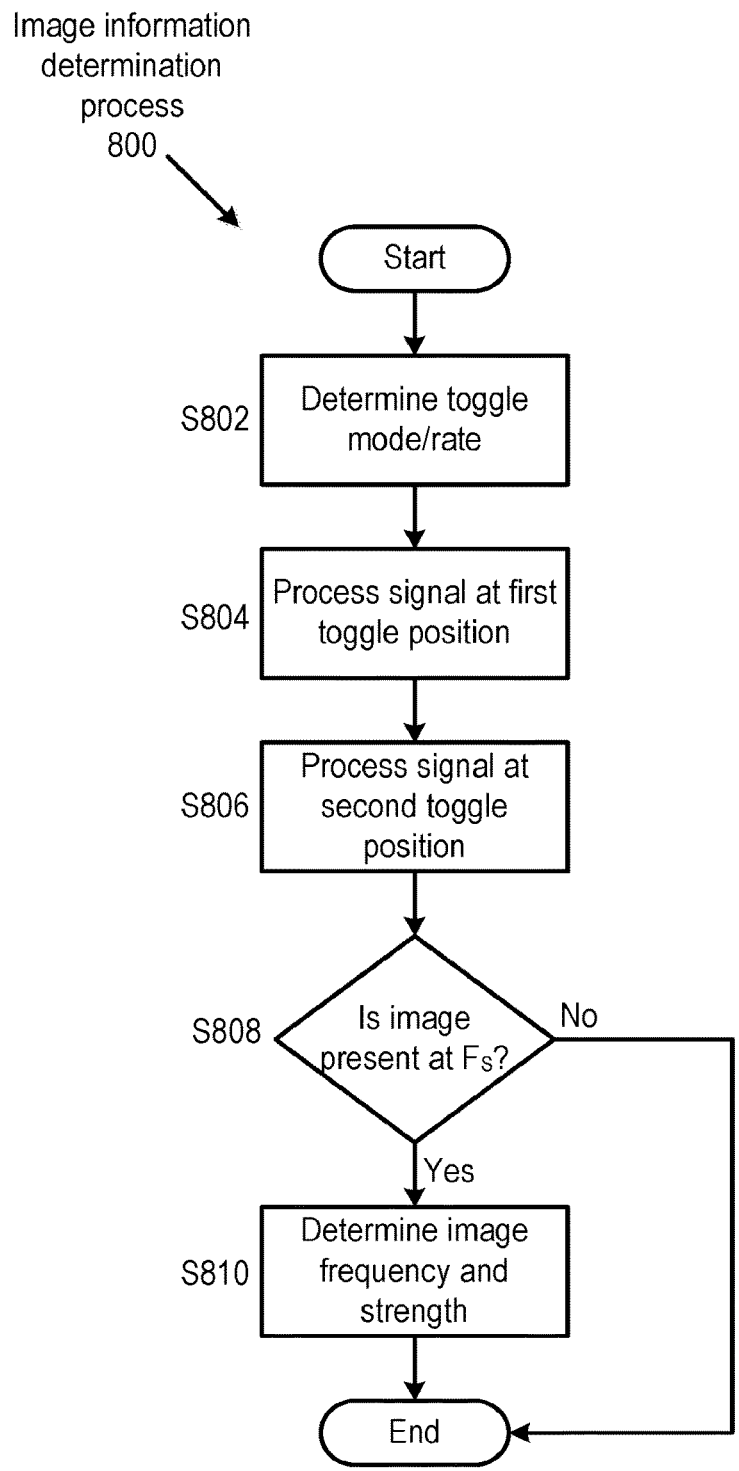
FIG. 8 is an exemplary diagram of an image information determination process, according to certain embodiments.

FIG. 8 is an exemplary diagram of an image information determination process 800, which is another implementation of step S402 of the image detection process 400, according to certain embodiments. The steps of the image information determination process 800 are described with respect to the receiver 700 but can also be implemented with other receiver configurations, such as receiver configurations with greater numbers of attenuation filter paths that have filters tuned to different frequency bands.

At step S802, the processing circuitry of the computing device 200 determines a toggle mode/rate for the receiver 700. The toggle rate can be determined based on properties of the received signals, such as transmission protocol, data transmission rate, or sampling frequency. For example, the processing circuitry of the computing device 200 can issue control signals to the switch 708 to toggle between the first toggle position 702 and the second toggle position 704 at a predetermined toggle rate, such as between each received signal packet or at a fraction of the sampling frequency.

At step S804, the received signal is processed for the first toggle position 702 of the switch 708 that corresponds to the attenuation filter path. For example, as discussed previously with respect to FIG. 7C, the graph 722 shows that the for the attenuation filter path, the receiver output includes the desired signal with a signal strength of magnitude x plus an image signal with a signal strength of ay, which corresponds to the signal strength of the image y times an attenuation factor a of the filter 706.

At step S806, the received signal is processed for the second toggle position 702 of the switch 708 that corresponds to the unfiltered path. For example, as discussed previously, the graph 724 shows that the for the unfiltered path, the receiver output includes the desired signal with a signal strength of magnitude x plus an image signal with a signal strength of y.

At step S808, the processed signals at each of the toggle positions are compared and correlated to determine whether image signals are present in the received signal for a current sampling rate, $F_S$. In some implementations, the processing circuitry of the computing device 200 determines that image signals are present in the received signal if a difference between one or more properties of the received signals for the attenuation filter path and the unfiltered path, such as signal strength or SNR, are greater than a predetermined threshold. For example, the difference between total signal strength for the output of the attenuation filter path (x+ay) and the unfiltered path (x+y) is greater than or equal to the predetermined threshold, which can indicate that image signals are present in the received signal at a frequency that corresponds to a frequency band of the filter 706. If it is determined that image signals are present for the current sampling rate, resulting in a "yes" at step S808, then step S810 is performed. Otherwise, if it is determined that image signals are not present for the current sampling rate $F_S$, resulting in a "no" at step S808, then the image information determination process 800 is terminated.

At step S810, if it is determined at step S808 that image signals are present at the current sampling rate, the processing circuitry of the computing device 200 determines properties associated with the image signal, such as image frequency, strength (power), and whether the image signal was attenuated by the filter 706 by at least a predetermined amount. In some implementations, the processing circuitry also determines an image source based on the properties of the image signal.

Figure 9A:
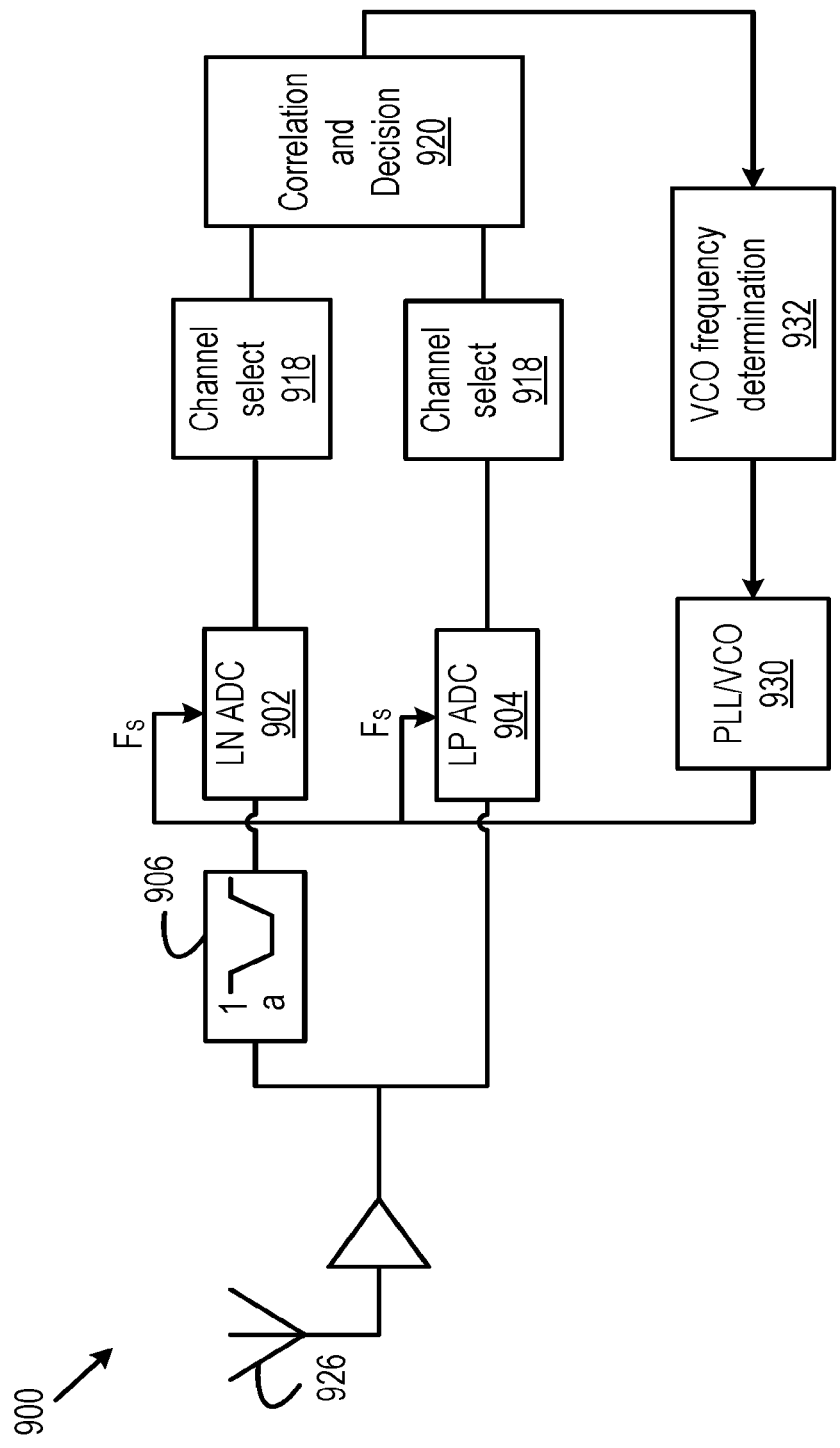
FIG. 9A is an exemplary diagram of a receiver, according to certain embodiments.

FIG. 9A is an exemplary diagram of a receiver 900, according to certain embodiments. The receiver 900 illustrates one technique for detecting image signals in received signals that includes sampling a filtered received signal with a low-noise (LN) ADC 902 and comparing the output to a received signal that is sampled with a low-power (LP) ADC 904 in parallel with the LN ADC 902 to determine whether image signals are present based on signal strength as well as an amount of correlation between an output from LN ADC 902 and the LP ADC 904. In addition, the LN ADC 902 has a noise floor that is less than a noise floor of the LP ADC 904 so that the LN ADC 902 can detect lower signal powers than the LP ADC 904. In other implementations, the LN ADC 902 may be another type of ADC other than a low-noise ADC and the LP ADC 904 may be another type of ADC other than a low-power ADC.

The receiver 900 also includes an antenna 926 as well as a filter 906 in series with and upstream from the LN ADC 902 that is configured to attenuate approximately 10-20 dB at predicted image signal frequencies but can also be configured for other amounts of attenuation. In one example, the filter 906 is a bandpass filter but can also be any other type of signal filter. The receiver 900 also has channel selectors 918 at the outputs of the LN ADC 902 and the LP ADC 904 which feed into a correlation and decision block 920. In certain embodiments, the channel selectors 918 and the correlation and decision block 920 are software defined components, which means that the channel selectors 918 and correlation and decision block may not have dedicated hardware but may be implemented via one or more processes executed by the processing circuitry of the computing device 200.

VCO frequency determination block 932 is a functional block that is executed by the processing circuitry of the computing device 200 and corresponds to step S406 of the image detection process 400 where the outputs of ADCs 902 and 904 are processed to determine whether to modify the frequency of PLL/VCO 930. For example, the processing circuitry determines a modified frequency of PLL/VCO 930, which corresponds to sampling frequency $F_S$ of the ADCs 902 and 904 so that the image signals do not interfere with the received signals. In addition, the PLL/VCO 930 may have dedicated hardware or may be a software defined component. In some implementations, the PLL includes a VCO and maintains the VCO locked on a predetermined frequency. However, in other implementations, the VCO may be free running without a PLL. The PLL/VCO 930 and frequency determination block 932 illustrated in the diagram of the receiver 900 can also be implemented with respect to the receivers 500 and 700 described previously.

In some aspects, the processing circuitry can determine when to modify the VCO frequency of the receiver 900 to remove effects of the image signals based on an amount of correlation between the outputs of the LN ADC 902 and LP ADC 904 as well as signal powers of the image signals as well as the desired signal. For example, the processing circuitry of the computing device 200 may modify the VCO frequency of the receiver 900 when the outputs of the LN ADC 902 and the LP ADC 904 are correlated and a difference between the signal strength of the desired signal component output from the LN ADC 902 and the desired signal component output LP ADC 904 is greater than a predetermined threshold. The VCO frequency may also be modified when the outputs of the LN ADC 902 and the LP ADC 904 are not correlated and at least a portion of the received signal is visible above a noise floor for the LP ADC 904. In some implementations, correlation between the ADC outputs can be determined by an amount of correspondence between each of the outputs, which may be indicated by ratios of desired signal power to image signal power for each of the outputs or differences between desired signal power and image signal power. In addition, it can be determined that the outputs of the ADCs 902 and 904 are uncorrelated if an average of a product of the received signal powers from each of the ADC outputs is equal to zero. Details regarding other correlation techniques are discussed further herein.

Figure 9B:
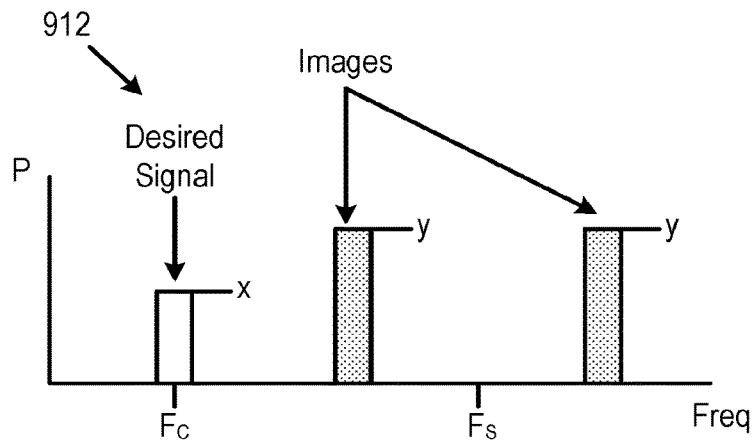
FIG. 9B is an exemplary graph of received signals, according to certain embodiments.
Figure 9C:
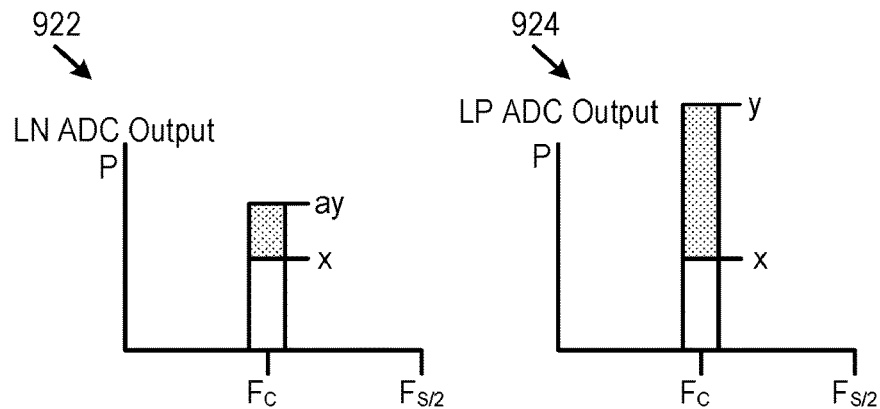
FIG. 9C is an exemplary graph of received signals, according to certain embodiments.
Figure 9D:
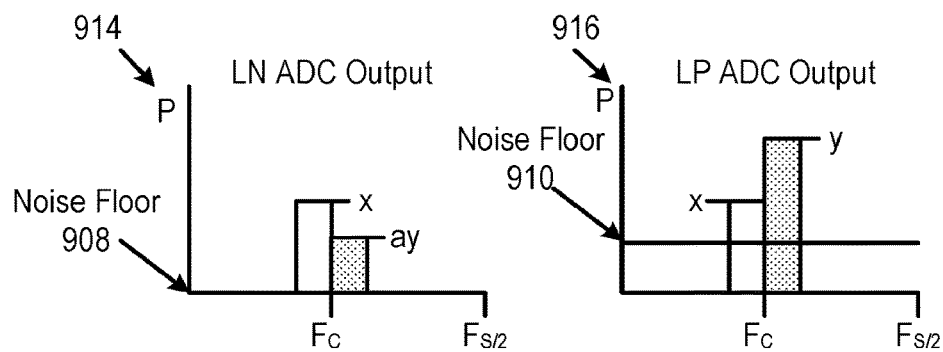
FIG. 9D is an exemplary graph of received signals, according to certain embodiments.

FIGS. 9B, 9C, and 9D are exemplary graphs illustrating signals at the receiver 900, according to certain embodiments. In FIG. 9B, graph 912 illustrates the signals received by the receiver 900. For example, the desired signal is located at carrier frequency $F_C$, and image signals are centered on sampling frequency $F_S$. In addition, the desired signal has a signal strength of magnitude x, and the image signals have a signal strength of magnitude y.

In FIG. 9C, graph 922 illustrates the receiver output from the LN ADC 902, and graph 924 illustrates the receiver output from the LP ADC 904. The graph 722 shows that the output from the LN ADC 902 includes the desired signal with a signal strength of magnitude x plus an image signal with a signal strength of ay, which corresponds to the signal strength of the image y times an attenuation factor a of the filter 906. The graph 924 shows that the output from the LP ADC 904 includes the desired signal with a signal strength of magnitude x plus an image signal with a signal strength of y.

FIG. 9D includes graphs 914 and 916, which alternate graphical representation of the graphs 922 and 924 from FIG. 9C. For example, graph 914 is an alternate representation of the output from the LN ADC 902 in graph 922, and graph 916 is an alternate representation of the output from the LP ADC 904 in graph 924. Rather than show the desired signal and image signal centered on the carrier frequencies, the graphs 914 and 916 illustrate the desired signal and the image signal with respect to noise floors for the ADCs 902 and 904. For example, the graph 914 shows the output from the LN ADC 902 with respect to noise floor 908, and the graph 916 shows the output from the LP ADC 904 with respect to the noise floor 910. In addition, the noise floor 910 for the LP ADC 904 is greater than the noise floor 908 for the LN ADC output 914.

Figure 10:
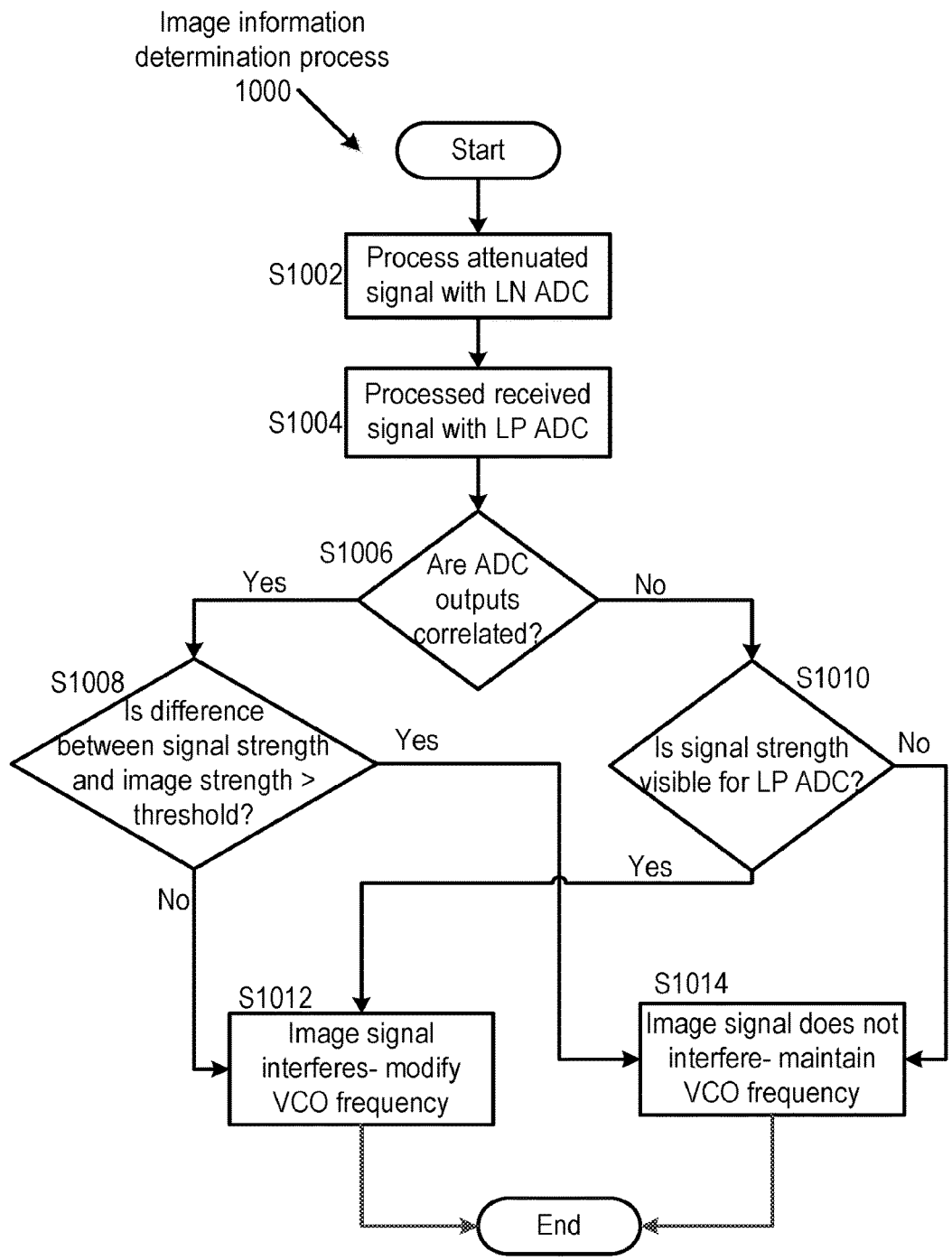
FIG. 10 is an exemplary flowchart of an image information determination process, according to certain embodiments.

FIG. 10 is an exemplary flowchart of an image information determination process 1000, which is another implementation of step S402 of the image detection process 400, according to certain embodiments. The steps of the image information determination process 1000 are described with respect to the receiver 900 but can also be implemented with other receiver configurations that have multiple receiver paths and ADCs having unequal noise floors.

At step S1002, the processing circuitry of the computing device 200 processes the attenuated signal output from the filter with the LN ADC 902. For example, as discussed previously with respect to FIG. 9C, the graph 922 shows that the for the output from the LN ADC 902, the signal includes the desired signal with a signal strength of magnitude x plus an image signal with a signal strength of magnitude ay, which corresponds to the signal strength of the image y times an attenuation factor a of the filter 706. In addition, the graph 914 in FIG. 9D shows the desired signal and image signal strength with respect to the noise floor 908.

At step S1004, the processing circuitry of the computing device 200 processes the received signal with the LP ADC 904. For example, as discussed previously with respect to FIG. 9C, the graph 924 shows that the for the output from the LN ADC 904, the signal includes the desired signal with a signal strength of magnitude x plus an image signal with a signal strength of y. In addition, the graph 916 in FIG. 9D shows the desired signal and image signal strength with respect to the noise floor 910.

At step S1006, the processing circuitry determines whether the outputs from the LN ADC 902 and the LP ADC 904 are correlated. In some implementations, correlation between the ADC outputs can be determined by an amount of correspondence between each of the outputs, which may be indicated by ratios of desired signal power to image signal power for each of the outputs or differences between desired signal power and image signal power. In addition, it can be determined that the outputs of the ADCs 902 and 904 are uncorrelated if an average of a product of the received signal powers from each of the ADC outputs is equal to zero. Details regarding other correlation techniques are discussed further herein. If it is determined that the outputs from the LN ADC 902 and the LP ADC 904 are correlated, resulting in a "yes" at step S1006, then step S1008 is performed. Otherwise, if it is determined that the outputs from the LN ADC 902 and the LP ADC 904 are not correlated, resulting in a "no" at step S1006, then step S1010 is performed.

At step S1008, if the outputs from the LN ADC 902 and the LP ADC 904 are correlated, then it is determined whether a difference between desired signal strength for each of the ADCs 902 and 904 and/or image signal strength for each of the ADCs 902 and 904 is greater than a predetermined threshold. If it is determined that the difference in signal strengths between outputs of the ADCs 902 and 904 is greater than the predetermined threshold, resulting in a "yes" at step S1008, then step S1014 is performed. Otherwise, if it is determined that the difference in signal strengths between outputs of the ADCs 902 and 904 is less than or equal to the predetermined threshold, resulting in a "no" at step S1008, then step S1012 is performed.

At step S1012, it is determined that the image signal interferes with the received signal based on the correlation and signal strength determinations, which indicates that the VCO frequency of the receiver 900 can be modified to reduce the effects of the image signals on the received signal. In some implementations, the VCO frequency is modified when the amount of attenuation of the received signal by the filter 906 is greater than a difference between a difference between the noise floors 908 and 910.

At step S1014, it is determined that the image signal does not interfere with the received signal based on the correlation and signal strength determinations, which indicates that an impact of the image signal on the received signal is low enough the desired signal component can be detected at the receiver 900 without modifying the VCO frequency.

Figure 11:
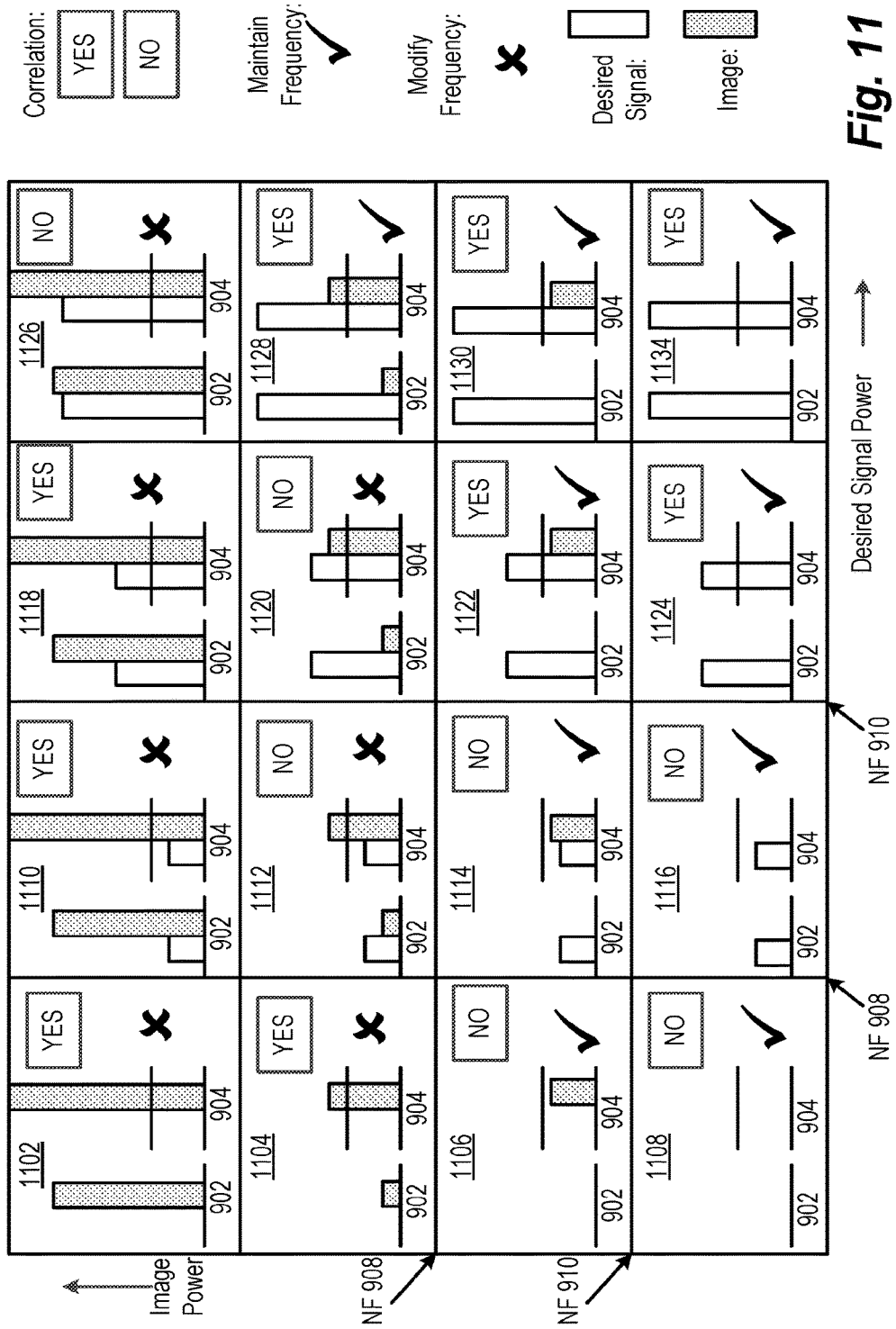
FIG. 11 is an exemplary chart of outputs from a receiver, according to certain embodiments.

FIG. 11 is an exemplary chart of outputs from the receiver 900, according to certain embodiments. The chart includes graphs of the outputs of the LN ADC 902 and the LP ADC 904 for various desired signal powers and image signal powers. For example, moving from left to right across the chart, the desired signal power increases, and moving from the bottom of the chart to the top of the chart, the image signal power increases. The graphs of the ADC outputs also show the desired signal power and image signal power with respect to the noise floors 908 and 910. The signal correlation is based on the desired signal power and received signal power that is visible above both the noise floor 908 and the noise floor 910.

The chart in FIG. 11 also indicates whether the outputs of the ADCs 902 and 904 are correlated and for each of the graphs of the ADC outputs and whether the ADC outputs result in modifying or maintaining the VCO frequency of the receiver 900. In some implementations, the VCO frequency is modified when the amount of attenuation of the received signal by the filter 906 is greater than a difference between a difference between the noise floors 908 and 910. In some aspects, the processing circuitry can determine when to modify the VCO frequency of the receiver 900 to remove effects of the image signals based on an amount of correlation between the outputs of the LN ADC 902 and LP ADC 904 as well as signal powers of the image signals as well as the desired signal. For example, the processing circuitry of the computing device 200 may modify the VCO frequency of the receiver 900 when the outputs of the LN ADC 902 and the LP ADC 904 are correlated and a difference between the signal strength of the desired signal component output from the LN ADC 902 and the desired signal component output LP ADC 904 is greater than a predetermined threshold. The VCO frequency may also be modified when the outputs of the LN ADC 902 and the LP ADC 904 are not correlated and at least a portion of the desired signal is visible above the noise floor 910 for the LP ADC 904.

For the graphs in FIG. 11, graphs 1102, 1110, 1118, 1126, 1104, 1112, 1120, and 1128 show ADC outputs which result in modification of the VCO frequency of the receiver 900. For example, for the graphs 1102, 1110, 1118, and 1104, the outputs of the ADCs 902 and 904 are correlated and a difference between desired signal strength for each of the ADCs 902 and 904 and/or image signal strength for each of the ADCs 902 and 904 is greater than a predetermined threshold. For the graphs 1126, 1104, 1112, and 1120, the outputs from the ADCs 902 and 904 are not correlated, and at least a portion of the received signal is visible above the noise floor 910 of the LP ADC 904.

Graphs 1128, 1106, 1114, 1122, 1130, 1108, 1116, 1124, and 1134 show ADC outputs which result in maintaining the VCO frequency of the receiver 900. For example, for the graphs 1128, 1122, 1124, 1130, and 1134, the outputs of the ADCs 902 and 904 are correlated, and a difference between desired signal strength for each of the ADCs 902 and 904 and/or image signal strength for each of the ADCs 902 and 904 is less than or equal to a predetermined threshold. For the graphs 1106, 1108, 1114, and 1116, the outputs from the ADCs 902 and 904 are not correlated, and none of the received signal is visible above the noise floor 910 of the LP ADC 904.

Figure 12:
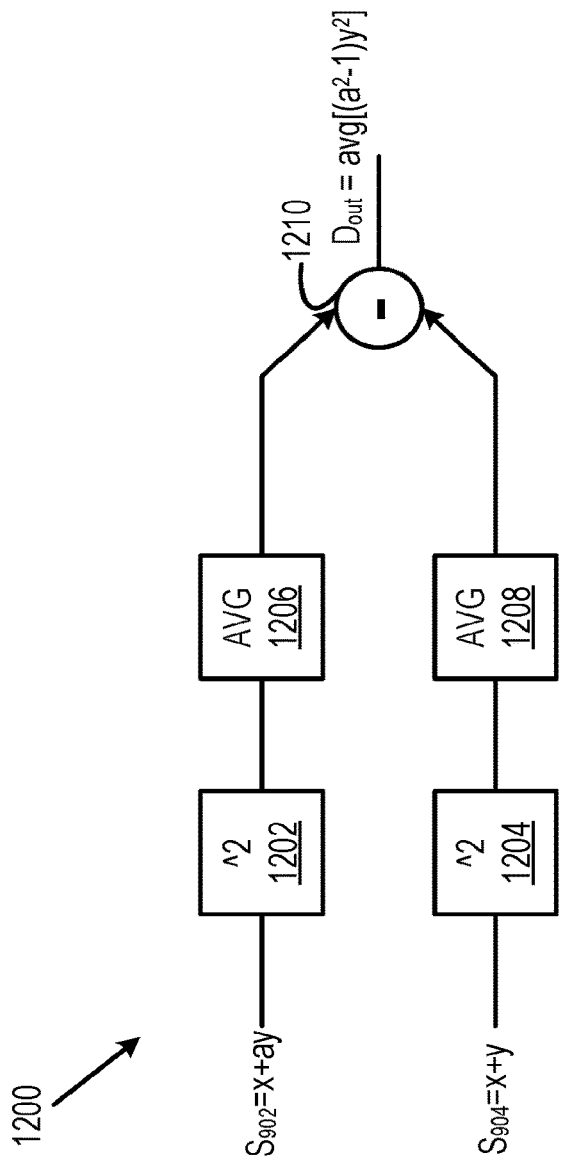
FIG. 12 is an exemplary diagram of a signal correlator, according to certain embodiments.

FIG. 12 is an exemplary diagram of a signal correlator 1200, according to certain embodiments. The signal correlator 1200 is another implementation of at least one of steps S1006, S1008, and S1010 of the image information detection process 1000 described previously and is also an implementation of the correlation and decision block 920 of the receiver 900. The signal correlator 1200 is a software defined component, and the operations of the signal correlator 1200 are performed by the processing circuitry of the computing device 200. The output $S_{902}$ from the LN ADC 902 can be described by Equation (1), and the output $S_{904}$ from the LP ADC 904 can be described by Equation (2).

$$S_{902} = x + ay \quad (1)$$

$$S_{904}=x+y \quad (2)$$

The squares of the outputs $S_{902}$ and $S_{904}$ are calculated at operation blocks 1202 and 1204, and an average of each of the outputs of the operation blocks 1202 and 1204 is taken at operation blocks 1206 and 1208, which can be described by the Equations (3) and (4), respectively.

$$\text{avg}[S_{902}^2]=\text{avg}[x^2+2axy+a^2y^2]=\text{avg}[x^2+a^2y^2] \quad (3)$$

$$\text{avg}[S_{904}^2]=\text{avg}[x^2+2xy+y^2]=\text{avg}[x^2+y^2] \quad (4)$$

The output $D_{out}$ of the signal correlator 1200 is calculated at operator 1210 by subtracting the output of block 1208 from the output of block 1206, which can be described by Equation (5).

$$D_{out}=\text{avg}[(a^2-1)y^2] \quad (5)$$

if the value of $D_{out}$ is greater than a predetermined threshold, then it is determined that the received signal power at the image frequency is also greater than another predetermined threshold, and the processing circuitry of the computing device 200 modifies the VCO frequency.

Figure 13A:
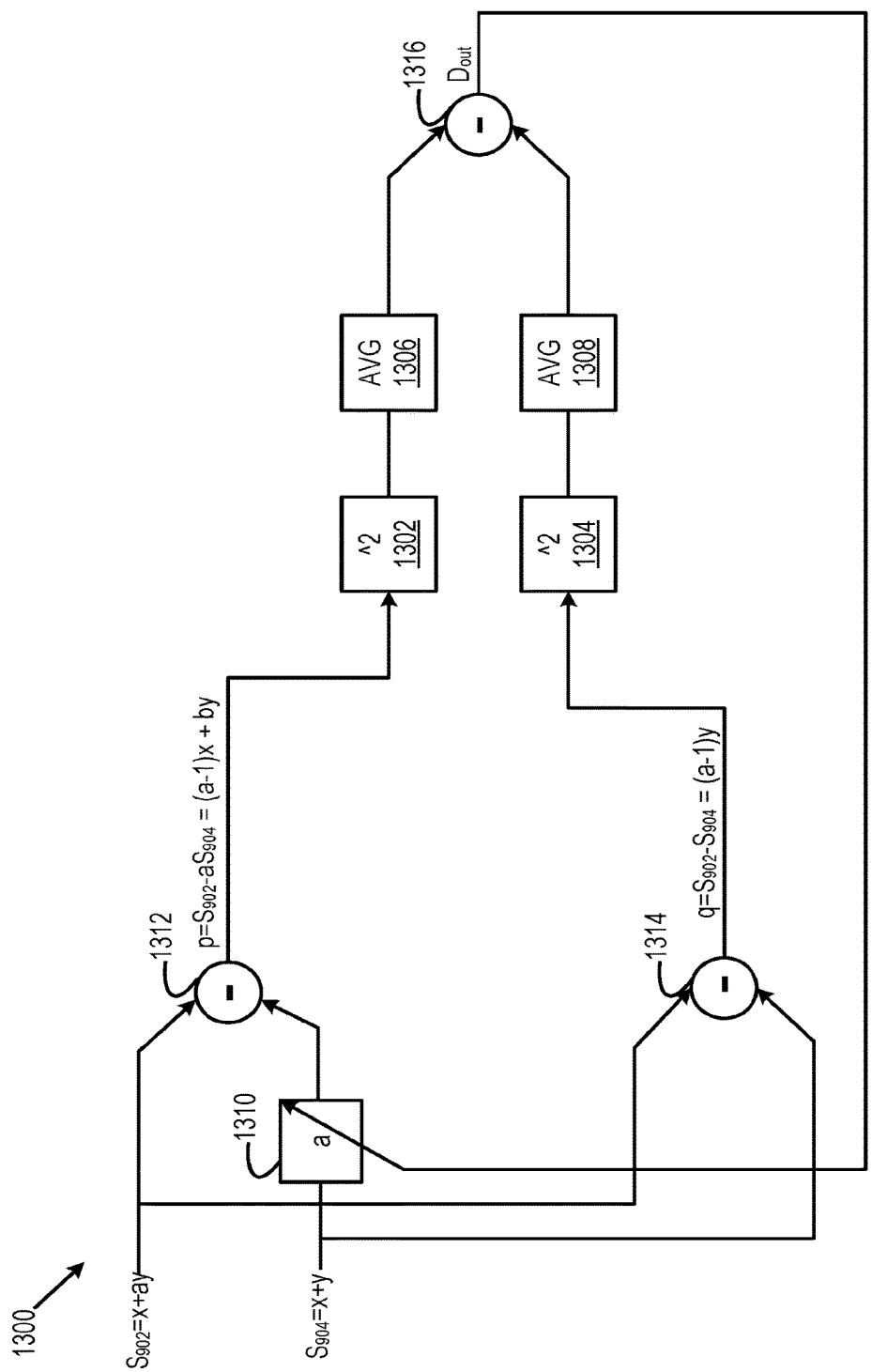
FIG. 13A is an exemplary diagram of a signal correlator, according to certain embodiments.

FIG. 13A is an exemplary diagram of an adaptive signal correlator 1300, according to certain embodiments. The signal correlator 1300 is another implementation of at least one of steps S1006, S1008, and S1010 of the image information detection process 1000 described previously and is also an implementation of the correlation and decision block 920 of the receiver 900. The signal correlator 1200 is a software defined component, and the operations of the signal correlator 1200 are performed by the processing circuitry of the computing device 200.

The signal correlator 1300 includes a first subtraction operator 1312 that determines a value p by subtracting the output from the LP ADC 904 multiplied by filter gain a 1310 from the output of the LN ADC 902 as shown by Equation (6). The filter gain a 1310 is an adaptive term that is updated based on the output $D_{out}$ of the signal correlator 1300. Term b in the Equation (6) represents a residue factor that may be produced due to imperfections that may exist in the receiver 900.

$$p=S_{902}-S_{904}=(a-1)x+by \quad (6)$$

In addition, the signal correlator 1300 includes a second subtraction operator 1314 that determines a value q by subtracting the output from the LP ADC 904 from the output of the LN ADC 902 as shown by Equation (7).

$$q=S_{902}-S_{904}=(a-1)y \quad (7)$$

The squares of the outputs p and q are calculated at operation blocks 1302 and 1304, and an average of each of the outputs of the operation blocks 1302 and 1304 is taken at operation blocks 1306 and 1308.

The output $D_{out}$ of the signal correlator 1300 is an indication of an amount of correlation between the outputs of the ADCs 902 and 904 and is calculated at subtraction operator 1316 by subtracting the output of block 1308 from the output of block 1306. The filter gain a 1310 is updated based on the output $D_{out}$. In some implementations, the filter gain a 1310 is updated so that the output $D_{out}$ goes to zero. When the output $D_{out}$ of the signal correlator 1300 does not go to zero, the processing circuitry of the computing device 200 can modify the VCO frequency of the receiver 900. A non-convergence of the output $D_{out}$ at zero can be an indication that the filter gain a 1310 is frequency dependent.

Figure 13B:
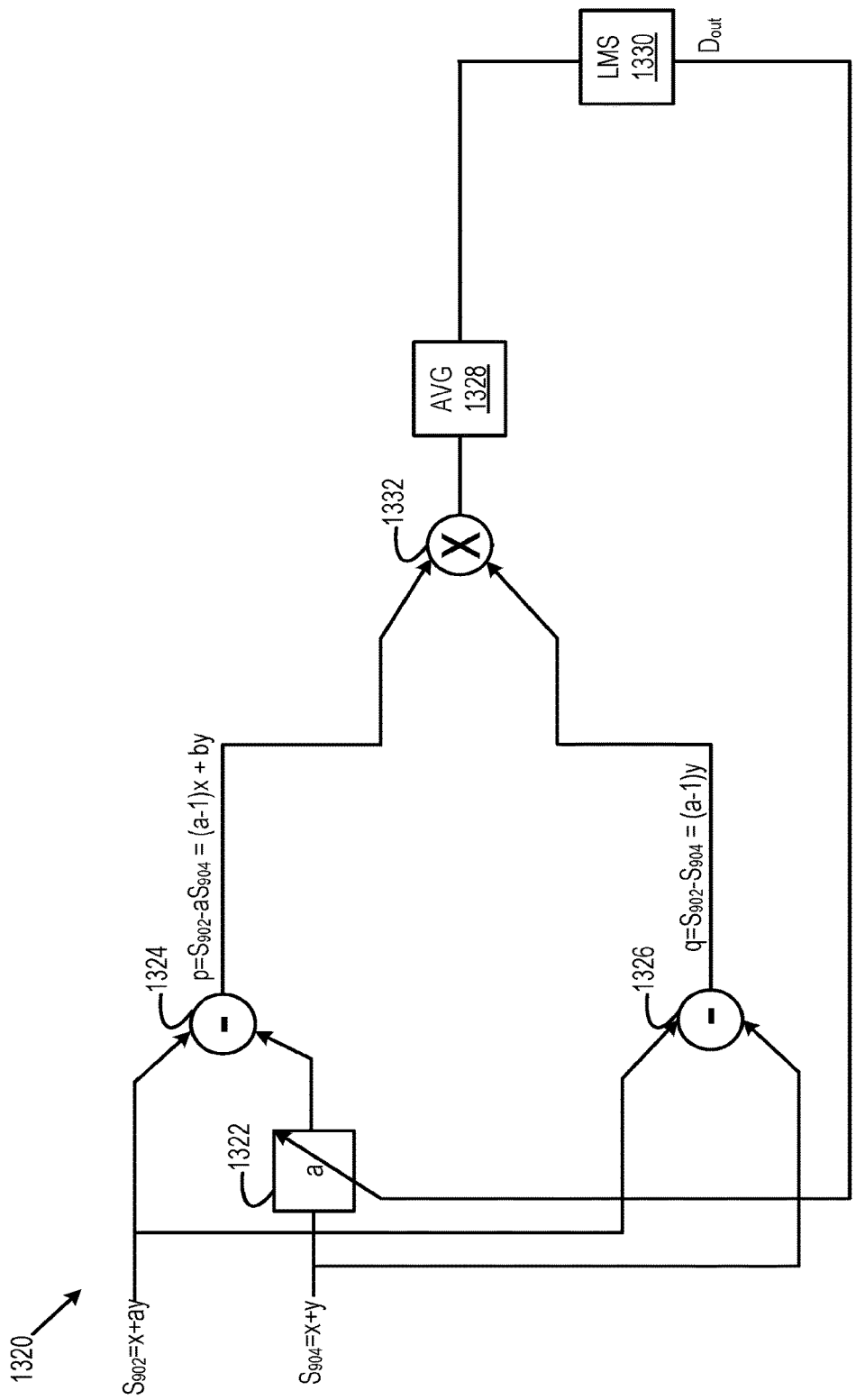
FIG. 13B is an exemplary diagram of a signal correlator, according to certain embodiments.

FIG. 13B is another exemplary diagram of an adaptive signal correlator 1320, according to certain embodiments. The signal correlator 1320 is another implementation of at least one of steps S1006, S1008, and S1010 of the image information detection process 1000 described previously and is also an implementation of the correlation and decision block 920 of the receiver 900. The signal correlator 1320 is a software defined component, and the operations of the signal correlator 1320 are performed by the processing circuitry of the computing device 200.

The signal correlator 1320 includes a first subtraction operator 1324 that determines a value p by subtracting the output from the LP ADC 904 multiplied by filter gain a 1322 from the output of the LN ADC 902 as shown in Equation (6). The filter gain a 1322 is an adaptive term that is updated based on the output $D_{out}$ of the signal correlator 1320. Term b in the Equation (6) represents a residue factor that may be produced due to imperfections that may exist in the receiver 900. In addition, the signal correlator 1320 includes a second subtraction operator 1326 that determines a value q by subtracting the output from the LP ADC 904 from the output of the LN ADC 902 as shown by Equation (7).

The values p and q are multiplied at multiplication operator 1332, and an average of each of an outputs of the multiplication operator 1332 is taken at operation block 1328. The output $D_{out}$ of the signal correlator 1320 is an indication of an amount of correlation between the outputs of the ADCs 902 and 904 and is calculated at a least means square (LMS) operator 1330. The filter gain a 1310 is updated based on the output $D_{out}$. In some implementations, the filter gain a 1310 is updated so that the output $D_{out}$ goes to zero. When the output $D_{out}$ of the signal correlator 1300 does not go to zero, the processing circuitry of the computing device 200 can modify the VCO frequency of the receiver 900. A non-convergence of the output $D_{out}$ at zero can be an indication that the filter gain a 1310 is frequency dependent.

Figure 14:
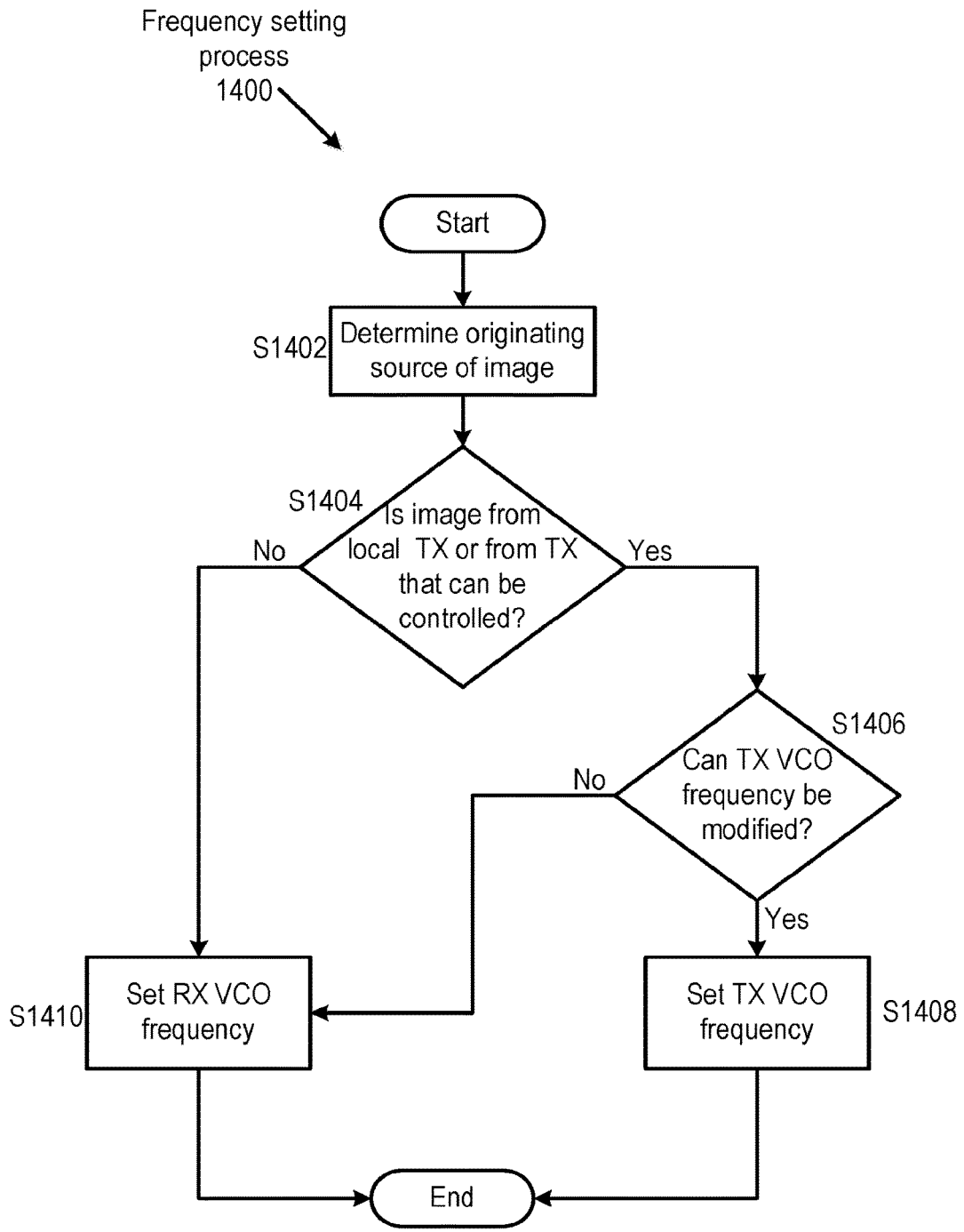
FIG. 14 is an exemplary flowchart of a frequency setting process, according to certain embodiments.

FIG. 14 is an exemplary flowchart of a frequency setting process 1400, according to certain embodiments. The frequency setting process 1400 is one implementation of step S408 of the image detection process 400 described previously with respect to FIG. 4.

At step S1402, the processing circuitry of the computing device 200 determines an originating source of the image signals. In some implementations, the originating source of the image signals may be a local transmitter (not shown) in the RF front end 216 of the computing device 200 or may be a transmitter that can be controlled by the computing device 200. The transmitters can include any type of transmitter of the RF front end 216 that is compatible with operational specifications of the RF front end 216. In addition, the originating source of the image signals may be from a transmitter that cannot be controlled by the computing device 200. The processing circuitry of the computing device 200 can determine the source of the image signals based on properties of the image signals, such as signal strength, frequency, bandwidth, and the like.

At step S1404, it is determined whether the originating source of the image signals corresponds to a local transmitter or a transmitter that can be controlled by the computing device 200. If it is determined that the originating source of the image corresponds to a local transmitter or a transmitter that can be controlled by the computing device 200, resulting in a "yes" at step S1404, then step S1406 is performed. Otherwise, if it is determined that the originating source of the image does not correspond to a local transmitter or a transmitter that can be controlled by the computing device 200, resulting in a "no" at step S1404, then step S1410 is performed.

At step S1406, if it has been determined that the originating source of the image corresponds to a local transmitter or a transmitter that can be controlled by the computing device 200, then it is determined whether the transmitter VCO frequency can be modified. If it is determined that the transmitter VCO frequency can be modified, resulting in a "yes" at step S1406, then step S1408 is performed. Otherwise, if it is determined that the transmitter VCO frequency cannot be modified, resulting in a "no" at step S1406, then step S1410 is performed.

At step S1408, the processing circuitry of the computing device 200 sets the transmitter VCO frequency for the local transmitter or the transmitter controlled by the computing device 200. At step S1410, the processing circuitry of the computing device 200 sets the receiver VCO frequency for the local receiver.

Figure 15A:
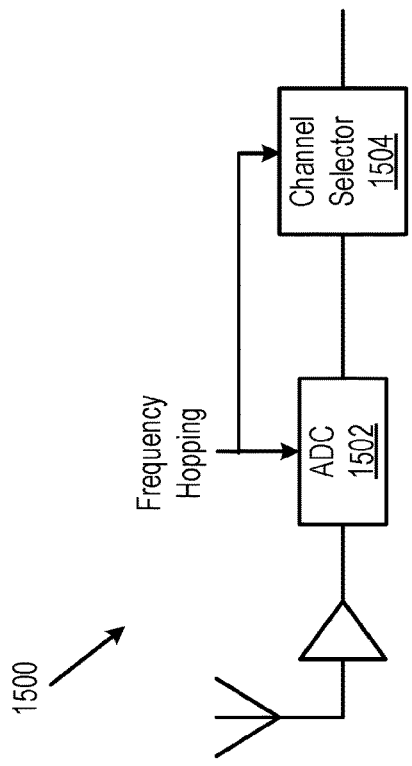
FIG. 15A is an exemplary diagram of a receiver, according to certain embodiments.

FIG. 15A is an exemplary diagram of a receiver 1500, according to certain embodiments. The receiver 1500 illustrates one technique for suppressing image signals received at the receiver 1500. The receiver 1500 includes an ADC 1502 as well as a channel selector 1504, which is a software defined component that may be implemented via one or more processes executed by the processing circuitry of the computing device 200. The processing circuitry applies a frequency hopping scheme at the VCO of the ADC 1502 for a frequency band corresponding to a frequency band of the image signal so that the strength of the image signals does not interfere with the desired signal. In some implementations, the receiver 1500 may not operate based on detected image information from an image information determination process, but rather applies the frequency hopping scheme across an image signal frequency band to suppress the image signal by spreading the image signal across a frequency spectrum so that less power from the image signal is present above of the desired signal. The frequency hopping scheme is tracked in a digital domain so that the desired signal can by recovered by the receiver 1500.

Figure 15C:
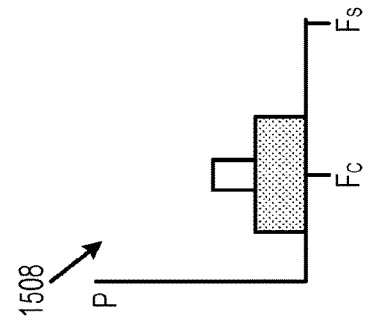
FIG. 15C is an exemplary graph of received signals, according to certain embodiments.
Figure 15B:
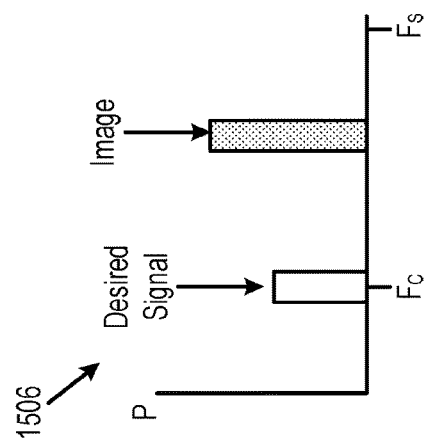
FIG. 15B is an exemplary graph of received signals, according to certain embodiments.

FIGS. 15B and 15C are exemplary graphs illustrating signals at the receiver 1500, according to certain embodiments. In FIG. 9B, graph 1506 illustrates the signals received by the receiver 1500. For example, the desired signal is located at carrier frequency $F_C$, and image signals are centered on sampling frequency $F_S$. In FIG. 9C, graph 1508 illustrates the desired signal and image signal after the frequency hopping scheme has been applied to the received signal via the ADC 1502 and the channel selector 1504. The image signal is spread across a wider frequency band than the desired signal so that less power from the image signal is present above of the desired signal, which improves the ease with which the desired signal can be recovered.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
   circuitry configured to
   detect one or more properties of an interference signal associated with a received signal based on toggling between a filtered signal path and an unfiltered signal path to an input of one or more (analog-to-digital converter) ADC configurations of a transceiver, the toggling between the filtered path and the unfiltered path occurring at least between packets included in the received signal,
   determine a VCO frequency corresponding to an ADC sampling frequency independently from a carrier frequency, and
   control the VCO frequency of at least one of a transmitter or receiver, based on the one or more properties of the interference signal, to shift a frequency of the interference signal to a filtered frequency.

2. The device of claim 1, wherein the one or more ADC configurations include a first ADC with a first sampling frequency and a second ADC with a second sampling frequency tuned to corresponding frequency bands.

3. The device of claim 2, wherein the first ADC and the second ADC are low-noise ADCs.

4. The device of claim 2, wherein the circuitry is further configured to correlate one or more interference signals output from the first ADC with one or more interference signals output from the second ADC located at a carrier frequency and at least one additional frequency.

5. The device of claim 2, wherein the circuitry is further configured to boost a desired signal by combining a first desired signal output from the first ADC with a second desired signal output from the second ADC.

6. The device of claim 1, wherein the toggling between the filtered signal path and the unfiltered signal path occurs at a predetermined fraction of a sampling frequency.

7. The device of claim 1, wherein the circuitry is further configured to detect the interference signal when a difference in an output from the ADC for the unfiltered signal path and the filtered signal path is greater than a predetermined threshold.

8. The device of claim 1, wherein the one or more ADC configurations include a first signal path with an attenuation filter connected to an input of a first ADC in parallel with a second signal path with a second ADC.

9. The device of claim 8, wherein a noise floor of the second ADC is greater than a noise floor of the first ADC.

10. The device of claim 8, wherein the attenuation filter is tuned to a predetermined frequency corresponding to an interference frequency.

11. The device of claim 8, wherein the circuitry is further configured to determine an amount of correlation between an output from the first ADC and the second ADC.

12. The device of claim 11, wherein the circuitry is further configured to modify the VCO frequency of the transmitter or the receiver in a case that:
   the amount of correlation between the output of the first ADC and the output of the second ADC is greater than a first predetermined threshold; and
   a difference in desired signal power between the output of the first ADC and the output of the second ADC is greater than a second predetermined threshold.

13. The device of claim 11, wherein the circuitry is further configured to modify the VCO frequency of the transmitter or the receiver in a case that:
   the amount of correlation between the output of the first ADC and the output of the second ADC is less than a first predetermined threshold; and
   a desired signal power output from the second ADC is greater than a second predetermined threshold.

14. The device of claim 1, wherein the circuitry is further configured to determine when the interference signal is associated with a local transmitter or a remote transmitter.

15. The device of claim 14, wherein the circuitry is further configured to modify the VCO frequency of the receiver when the interference signal is associated with the remote transmitter.

16. The device of claim 14, wherein the circuitry is further configured to modify the VCO frequency of the local transmitter when the interference signal is associated with the local transmitter.

17. A method comprising:
   detecting one or more properties of an interference signal associated with a received signal based on toggling between a filtered signal path and an unfiltered signal path to of one or more ADC configurations of a transceiver, the toggling between the filtered path and the unfiltered path occurring at least between packets included in the received signal;
   determining a VCO frequency corresponding to an ADC sampling frequency independently from a carrier frequency; and
   controlling the VCO frequency of at least one of a transmitter or receiver, based on the one or more properties of the interference signal, to shift a frequency of the interference signal to a filtered frequency.

18. A non-transitory computer-readable medium encoded with computer-readable instructions that, when executed by processing circuitry, cause the processing circuitry to perform a method comprising:
   detecting one or more properties of an interference signal associated with a received signal based on toggling between a filtered signal path and an unfiltered signal path to of one or more ADC configurations of a transceiver, the toggling between the filtered path and the unfiltered path occurring at least between packets included in the received signal;
   determining a VCO frequency corresponding to an ADC sampling frequency independently from a carrier frequency; and
   controlling the VCO frequency of at least one of a transmitter or receiver, based on the one or more properties of the interference signal, to shift a frequency of the interference signal to a filtered frequency.

* * * * *